United States Patent
Reynolds

(10) Patent No.: US 8,634,651 B2
(45) Date of Patent: Jan. 21, 2014

(54) METHODS AND APPARATUS FOR LOCATING TARGET PATTERNS IN AN IMAGE

(75) Inventor: John Reynolds, Tampa, FL (US)

(73) Assignee: Accusoft Corporation, Tampa, FL (US)

( * ) Notice: Subject to any disclaimer, the term of this patent is extended or adjusted under 35 U.S.C. 154(b) by 141 days.

(21) Appl. No.: 13/409,027

(22) Filed: Feb. 29, 2012

(65) Prior Publication Data

US 2013/0223745 A1  Aug. 29, 2013

(51) Int. Cl.
*G06K 9/46* (2006.01)
*G06K 9/00* (2006.01)

(52) U.S. Cl.
USPC .......................................... 382/195; 382/181

(58) Field of Classification Search
None
See application file for complete search history.

(56) References Cited

U.S. PATENT DOCUMENTS

| 6,708,884 | B1 * | 3/2004 | Su et al. ................. 235/462.09 |
| 7,273,175 | B2 * | 9/2007 | Zhao et al. ................. 235/454 |
| 2013/0048707 | A1 * | 2/2013 | Do ................. 235/375 |

* cited by examiner

*Primary Examiner* — Vikkram Bali
(74) *Attorney, Agent, or Firm* — Straub & Pokotylo; Michael P. Straub; Stephen T. Straub

(57) ABSTRACT

Methods and apparatus for efficiently locating QR code finder patterns and/or code QR alignment patterns in an image are described.

20 Claims, 29 Drawing Sheets

1200

| | | | | | | | | | | | | | | |
|---|---|---|---|---|---|---|---|---|---|---|---|---|---|---|
| 10 | 4 | 6 | 10 | 4 | 6 | 10 | 4 | 6 | 10 | 4 | 6 | 10 | 4 | 6 |
| 10 | 4 | 6 | 10 | 4 | 6 | 10 | 4 | 6 | 10 | 4 | 6 | 10 | 4 | 6 |
| 2 | 8 | 6 | 1 | 7 | 5 | 0 | 6 | 4 | 1 | 7 | 5 | 2 | 8 | 6 |
| 2 | 8 | 6 | 1 | 7 | 5 | 0 | 6 | 4 | 1 | 7 | 5 | 2 | 8 | 6 |
| 8 | 6 | 8 | 7 | 3 | 5 | 6 | 0 | 2 | 7 | 3 | 5 | 8 | 6 | 8 |
| 8 | 6 | 8 | 7 | 3 | 5 | 6 | 0 | 2 | 7 | 3 | 5 | 8 | 6 | 8 |
| 6 | 8 | 10 | 5 | 5 | 5 | 4 | 2 | 0 | 5 | 5 | 5 | 6 | 8 | 10 |
| 6 | 8 | 10 | 5 | 5 | 5 | 4 | 2 | 0 | 5 | 5 | 5 | 6 | 8 | 10 |
| 8 | 6 | 8 | 7 | 3 | 5 | 6 | 0 | 2 | 7 | 3 | 5 | 8 | 6 | 8 |
| 8 | 6 | 8 | 7 | 3 | 5 | 6 | 0 | 2 | 7 | 3 | 5 | 8 | 6 | 8 |
| 2 | 8 | 6 | 1 | 7 | 5 | 0 | 6 | 4 | 1 | 7 | 5 | 2 | 8 | 6 |
| 2 | 8 | 6 | 1 | 7 | 5 | 0 | 6 | 4 | 1 | 7 | 5 | 2 | 8 | 6 |
| 10 | 4 | 6 | 10 | 4 | 6 | 10 | 4 | 6 | 10 | 4 | 6 | 10 | 4 | 6 |
| 10 | 4 | 6 | 10 | 4 | 6 | 10 | 4 | 6 | 10 | 4 | 6 | 10 | 4 | 6 |

| 84 | 68 | 52 | 68 | 84 |
|----|----|----|----|----|
| 68 | 47 | 26 | 47 | 68 |
| 52 | 26 | 0  | 26 | 52 |
| 68 | 47 | 26 | 47 | 68 |
| 84 | 68 | 52 | 68 | 84 |

Final Sums

FIGURE 18

| FIGURE 25A | FIGURE 25B |

METHODS AND APPARATUS FOR LOCATING TARGET PATTERNS IN AN IMAGE

FIELD

Various embodiments are directed to methods and apparatus for locating target patterns within an image, and more, particularly to efficiently locating QR code finder patterns and/or QR code alignment patterns in an image.

BACKGROUND

First developed in 1994, QR codes are a two-dimensional barcode type that has come into much popularity with the recent ubiquity of mobile devices. Featuring a robust error correction mechanism and a number of structurally identifying features, this barcode type has been designed around ease of recognition. The most visually striking features of QR codes are the concentric square finder patterns and alignment patterns. These patterns serve as indicate boundary markers and indicate locations within the code to accurately align the barcode's modules.

Typical currently employed methods for locating finder patterns and alignment patterns within an image tend to require a relatively large number of pixel computations. This relatively large number of pixel computations results in a relatively long time processing time in locating a finder or alignment pattern when using a single processor. A large number of processors can be used in parallel to reduce the time to locate a finder or alignment pattern, but this may be expensive to implement. Also, processing time used for locating an alignment/finder pattern cannot be used for another application. In addition, in mobile devices, which are battery operated the amount of processing required to perform an operation correlates to the amount of battery energy being depleted.

Based on the above discussion it would be advantageous if more efficient methods and apparatus were developed for locating finder and/or alignment patterns within an image were developed.

SUMMARY

Methods and apparatus for locating target patterns in images are described. Various described methods and apparatus are well suited for locating QR code finder patterns and/or QR code alignment patterns in an image. Various exemplary embodiments efficiently locate a QR code finder and/or alignment pattern in an image. The methods may use fewer pixel computations than is typically performed using other techniques.

Various embodiments, exploit the structure of the QR code finder pattern and/or the structure of the QR code alignment pattern to reduce the number of calculations used to find the pattern in the image. Commonality in structure between the QR code alignment and finder patterns allows the same method, or a slight variation thereof, to be used in finding both types of patterns. Various exemplary embodiments use an approach that is scalable supporting efficient location of a QR code alignment and finder patterns of different module size.

In some embodiments, sets of difference values are generated based on comparisons of portions of the input image to three reference sets of pixel values. Each reference set of pixel values is one of three possible alternative patterns of pixel values that may occur in a row or column of the target pattern. Sums of difference values corresponding to possible locations of the target pattern within the image are calculated using selected elements from the sets of difference values. A location of a target pattern within the image is determined based on the location of the sum of difference values having the lowest value.

An exemplary method of identifying the location of a first target image pattern in an image, in accordance with some embodiments, comprises: generating, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image. The exemplary method further comprises: generating a first sum of difference values from at least some values in the generated sets of difference measure values, said sum of difference values indicating a detected amount of difference between a first two dimensional array of pixel values and a two dimensional target pattern; and making a decision as to the location of the first target pattern within said image based on at least said first sum of difference values.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 12 illustrates an exemplary queue-buffer including stored sets of {sum1, sum2, sum3} values.

FIG. 13 includes a drawing illustrating calculating final sum values from entries within queue-buffer of FIG. 12.

FIG. 14 includes a drawing illustrating calculating additional final sum values from entries within queue-buffer of FIG. 12.

FIG. 15 includes a drawing illustrating calculating additional final sum values from entries within queue-buffer of FIG. 12.

FIG. 17 includes a drawing illustrating calculating additional final sum values from entries within queue-buffer of Figure.

FIG. 18 is a 5×5 matrix of final sums, representing a composite of the sums of FIGS. 13, 14, 15, 16, and 17, and the 5×5 matrix is used to determine a likely location of the target alignment pattern within the input image.

DETAILED DESCRIPTION

Various embodiments are directed methods and apparatus used to find the location of finder and alignment patterns for QR codes in an image. The processed image is normally one known to have such a pattern and may be the result of intentionally scanning a QR code using a digital camera or other scanning device.

Figure 1:
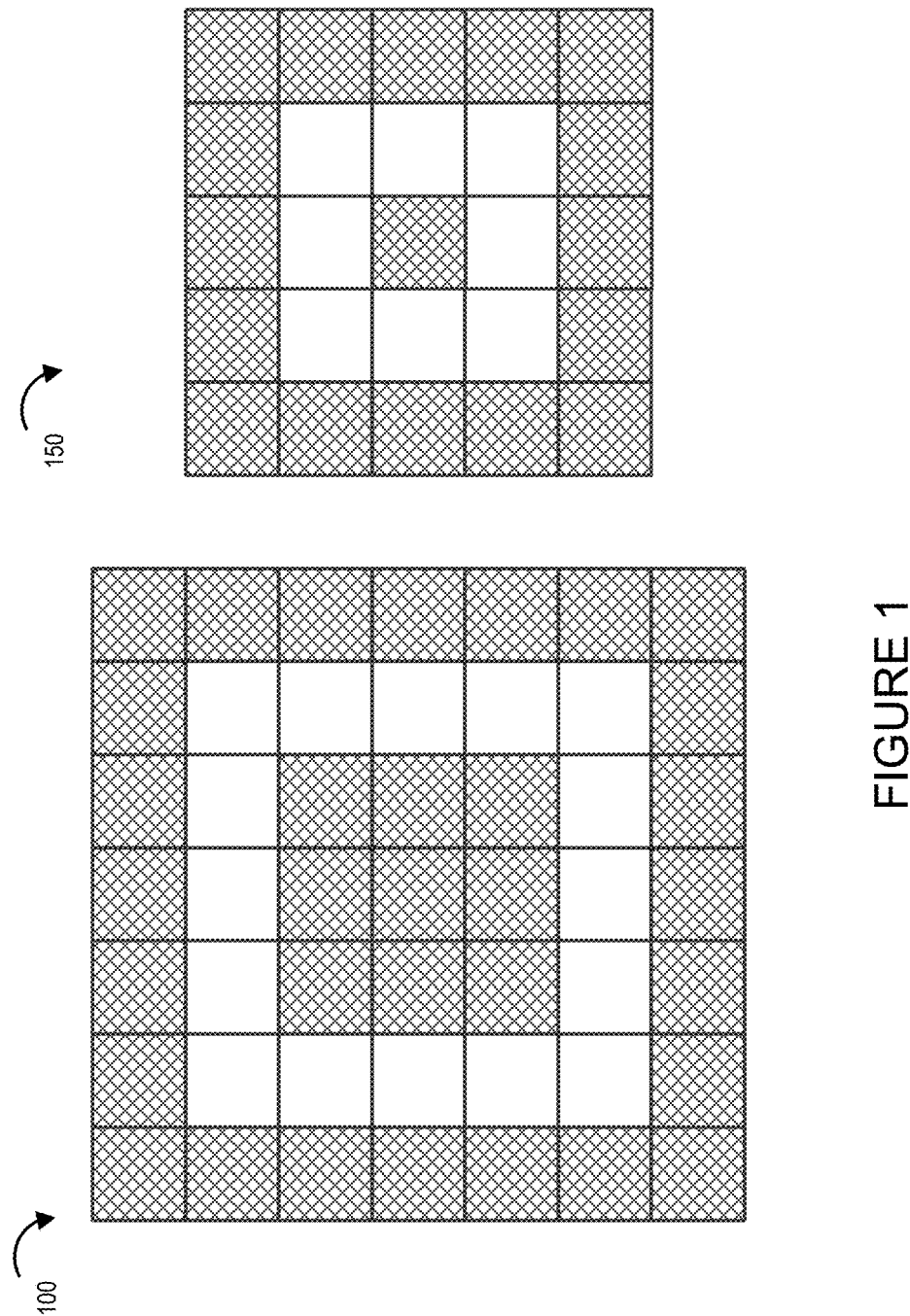
FIG. 1 illustrates an exemplary QR code finder pattern and an exemplary QR code alignment pattern.

In some such embodiments, the images have been pre-rotated such that the modules of the QR code are parallel to the horizontal axis. Two examples of patterns that various exemplary embodiments search for are illustrated in FIG. 1. Drawing 100 of FIG. 1 illustrates an exemplary QR code finder pattern and drawing 150 of FIG. 1 illustrates an exemplary QR code alignment pattern.

To find the most likely location of a template-image inside a larger image, one method is called the sum of absolute differences. Given an input image of dimensions (w, h) and a template-image of dimensions (w', h') calculate a two-dimensional array of differences using the following formula:

$$SUM_{x,y} = \sum_{i=j=0}^{\substack{i<w' \\ j<h'}} |IMAGE_{x+i,y+j} - TEMPLATE_{i,j}|$$

The (x, y) location in the array with the lowest value represents the location on the image that most closely resembles the template image. Naively implemented, this approach requires w'*h'*(w−w'+1)*(h−h'+1) pixel comparisons. In accordance with a feature of an exemplary embodiment, an exemplary novel method well suited to locate QR finder patterns reduces the total pixel comparisons to a much more reasonable value: h*(w'+6*(w−w'+1)).

Figure 2:
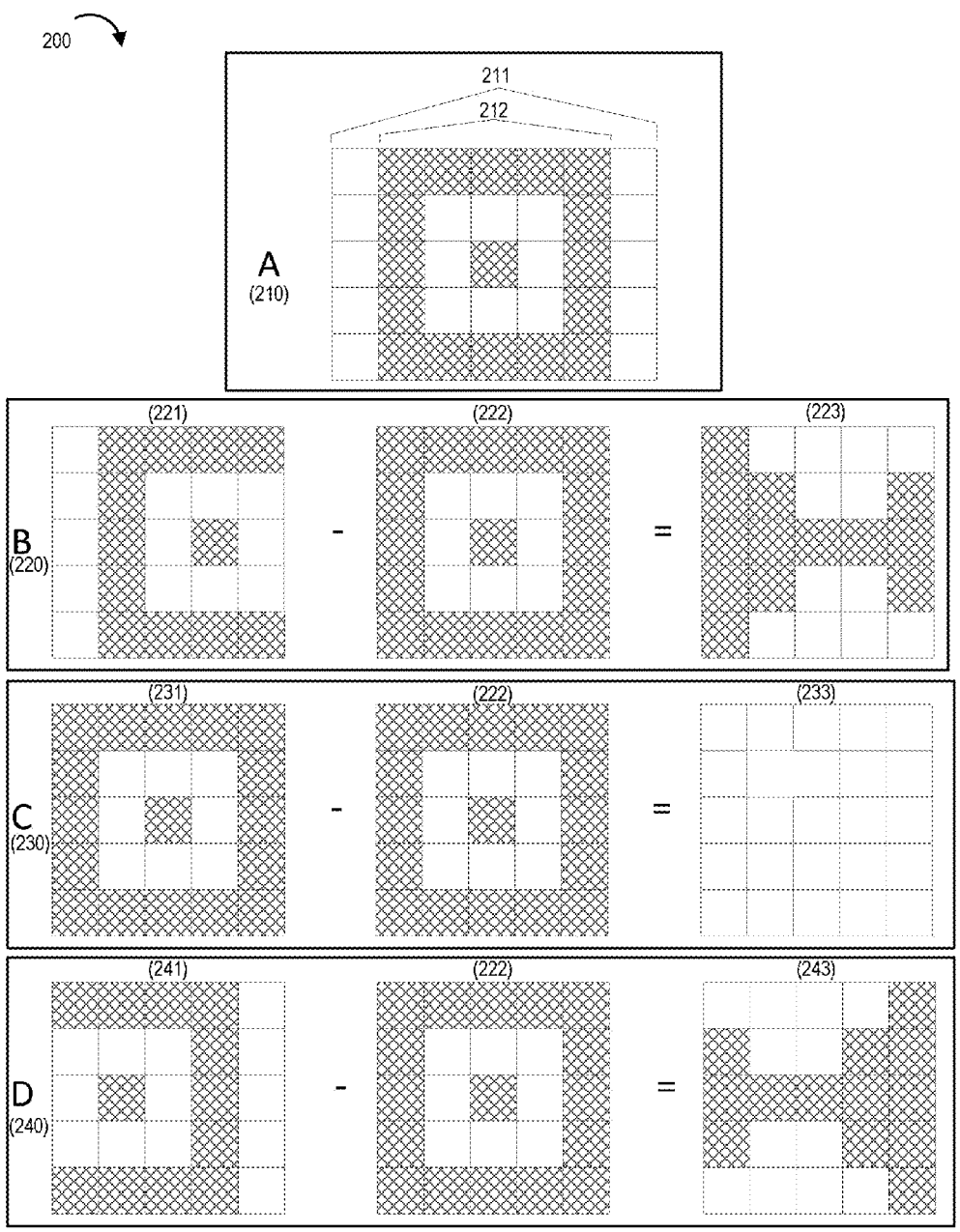
FIG. 2 illustrates an example in which the location of an alignment pattern within an exemplary image is being determined.

Drawing 200 of FIG. 2 illustrates an example in which the location of an alignment pattern within an exemplary image is being determined Box A 210 illustrates an exemplary 5×5 pixel alignment pattern 212 within a 7×5 pixel image 211. In this particular example, the alignment pattern is centered within the image. Each of boxes B, 220, C 230 and D 240 illustrates a comparison between a portion of the source image being searched and a target template 222, which is an alignment pattern. Box B 220 illustrates a comparison between the leftmost portion 221 of the source image 211 and the target pattern 222 which results in a difference pattern 223 identifying 13 differences. Box C 230 illustrates a comparison between the center portion 231 of the source image 211 and the target pattern 222 which results in a difference pattern 233 identifying 0 differences. Box D 240 illustrates a comparison between the rightmost portion 241 of the source image 211 and the target pattern 222 which results in a difference pattern 243 identifying 13 differences.

In this example, there are a total of 13 differences in comparisons of boxes B 220 and D 240, while there are 0 differences for the comparisons of box D 240. Thus the test location 231 of box C is the best fit for the template pattern that was being searched. In this particular example, it was an exact match. In other cases, the match may not be exact, e.g., one of the pixels within the area of the test image where the alignment pattern is located may have been corrupted.

Figure 3:
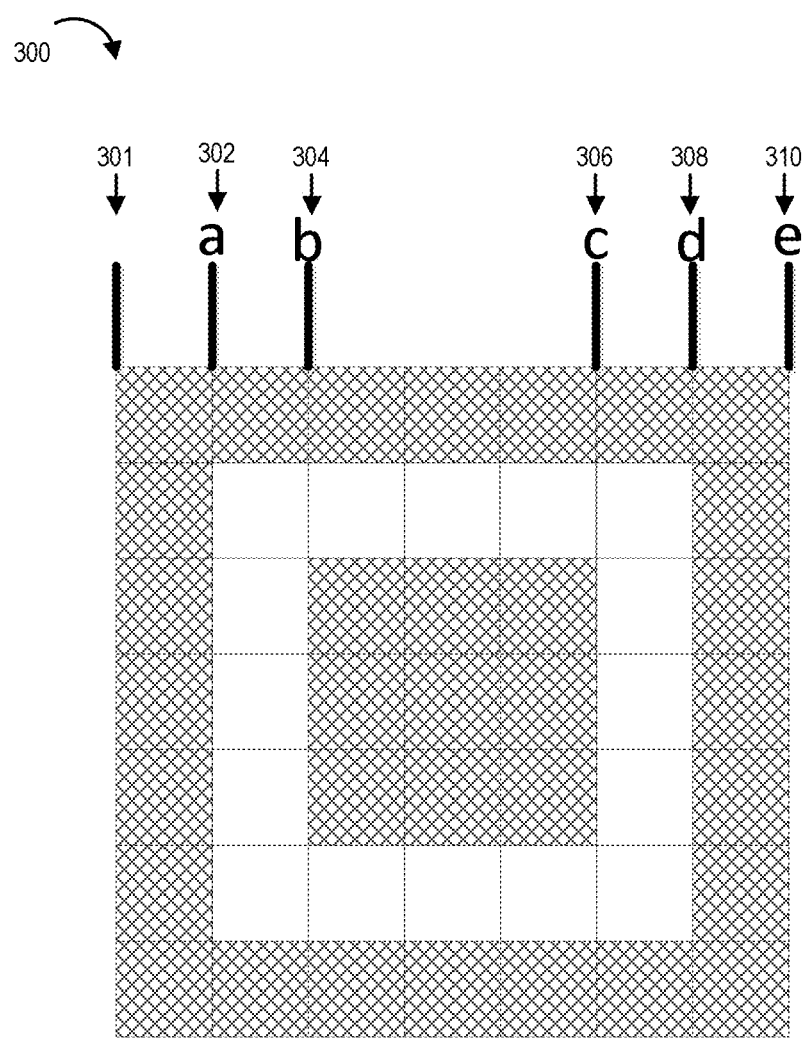
FIG. 3 illustrates an exemplary QR finder pattern with transition boundary parameters.

In some embodiments, a set of parameters pertaining to the target patterns are used, e.g., a set of {a, b, c, d, e} parameters. As can be seen, there are some commonalities in structure in the finder and alignment patterns. These commonalities in the patterns can be, and in various embodiments, are, exploited such that the same basic method or a slight variation of the method can be used for searching for both types of target patterns. In some embodiments, a mapping is created including a set of transition boundary parameters. FIG. 3 illustrates an exemplary QR finder pattern with transition boundary parameters. Line 301 illustrates a start reference point for the target pattern. Moving from left to right, parameter a 302 illustrates a first transition boundary; parameter b 304 illustrates a second transition boundary; parameter c 306 illustrates a third transition boundary; parameter d 308 illustrates a fourth transition boundary; and parameter e 310 represents a fifth transition boundary, which is the end of the target pattern.

In some embodiments, the {a, b, c, d, e} parameters are dictated by the following guidelines, based on the pixel offsets of the transition boundaries within the pattern type. Each value is rounded to the nearest integer value.

| Finder Pattern | Alignment Pattern |
|---|---|
| a = 1 * modsize | a = 1 * modsize |
| b = 2 * modsize | b = 2 * modsize |
| c = 5 * modsize | c = 3 * modsize |
| d = 6 * modsize | d = 4 * modsize |
| e = 7 * modsize | e = 5 * modsize |

Figure 4:
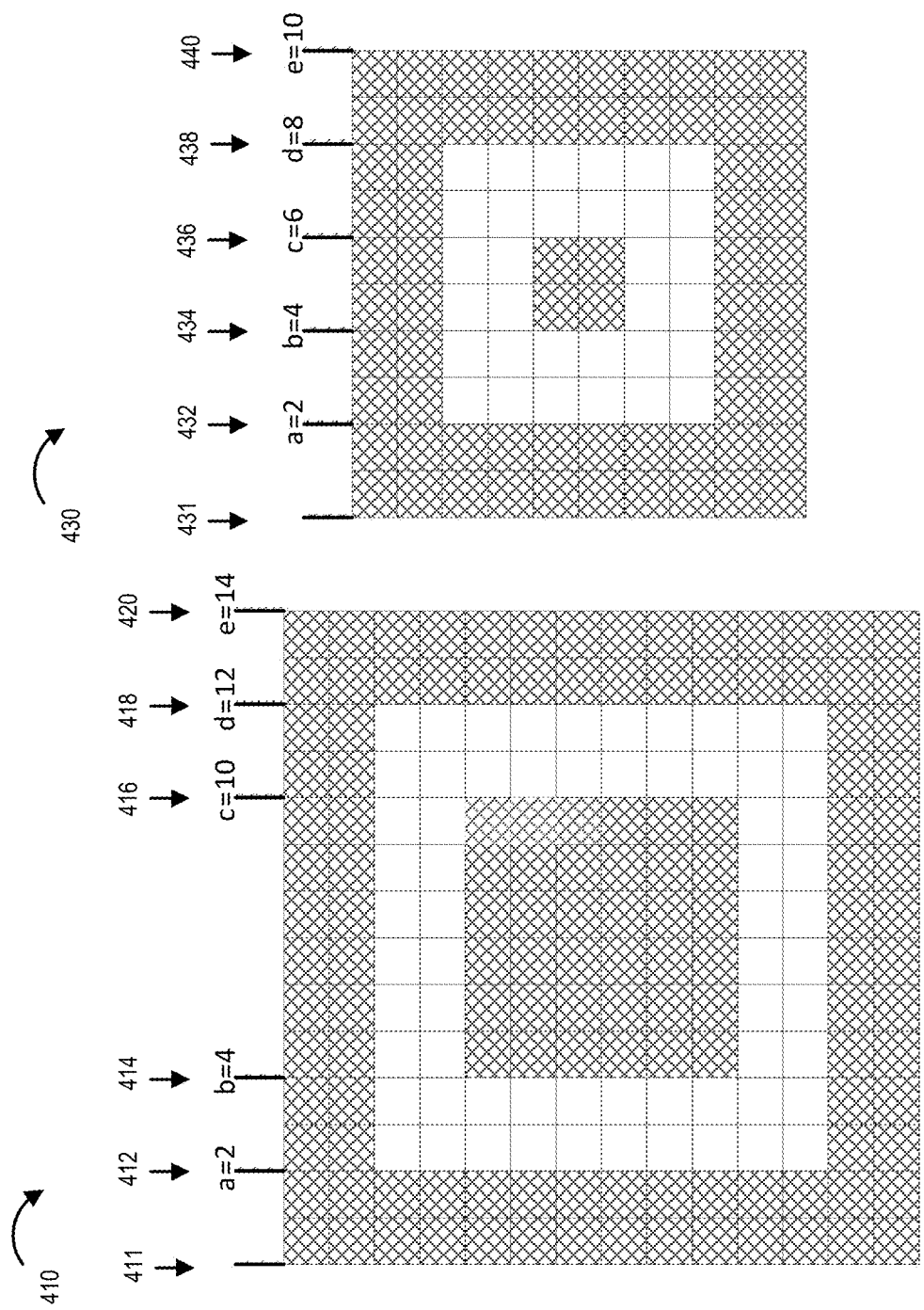
FIG. 4 illustrates two exemplary target patterns, a finder pattern and an alignment pattern, corresponding to module size of 2 and corresponding sets of transition boundary parameter values {a, b, c, d, e} in accordance with an exemplary embodiment.

FIG. 4 illustrates two exemplary target patterns corresponding to module size of 2 and corresponding sets of parameter values {a, b, c, d, e} in accordance with an exemplary embodiment. Drawing 410 of FIG. 4 illustrates an exemplary finder pattern with module size=2. Line 411 is the leftmost edge reference point of the finder pattern 410, and the set of transition boundary parameters are: a 412, b 414, c 416, d 418, and e 420. In the exemplary finder pattern 410 transition boundary parameter a=2; b=4; c=10; d=12; and e=14. Drawing 430 of FIG. 4 illustrates an exemplary alignment pattern with module size=2. Line 431 is the leftmost edge reference point of the alignment pattern 431, and the set of transition boundary parameters are: a 432, b 434, c 436, d 438, and e 440. In the exemplary alignment pattern 430 transition boundary parameter a=2; b=4; c=6; d=8; and e=10.

Figure 5:
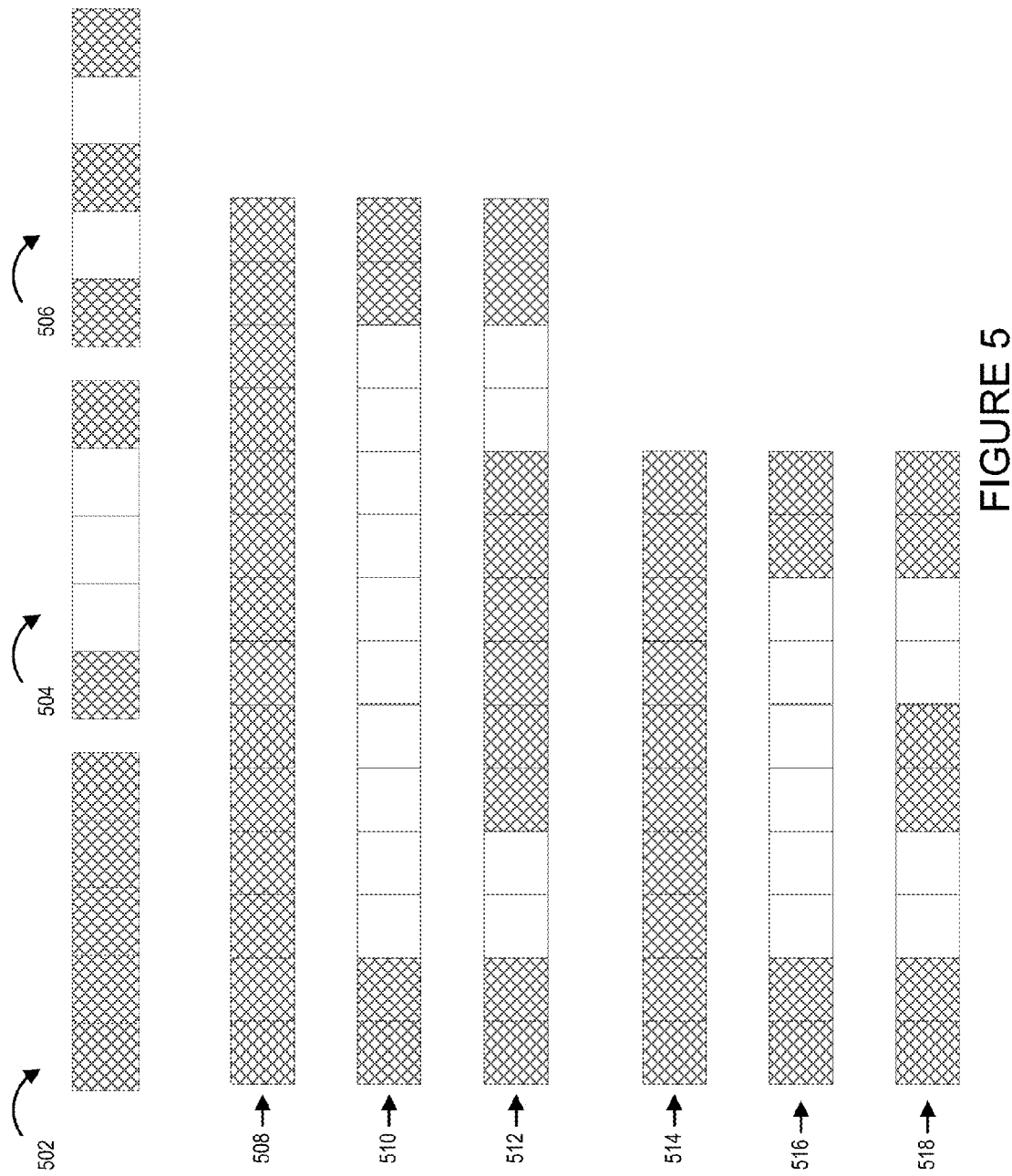
FIG. 5 illustrates the three types of code patterns in which rows of QR code finder/alignment patterns are classified in accordance with an exemplary embodiment.

Each row of the QR alignment/finder pattern can be, and is, classified, into one of three subtypes: The first type of QR code pattern is all black. The second type of QR code pattern is black, white, black. The third type of QR code pattern is black, white, black, white, black. FIG. 5 illustrates the three types of QR code patterns. Drawing 502 illustrates an exemplary all black pattern. Drawing 504 illustrates an exemplary black, white, black pattern. Drawing 506 illustrates an exemplary black, white, black, white.

Drawing 508 is an all black pattern corresponding finder pattern 410. Drawing 510 is a black, white, black pattern corresponding finder pattern 410. Drawing 512 is a black, white, black, white, black pattern corresponding finder pattern 410.

Drawing 514 is an all black pattern corresponding alignment pattern 430. Drawing 516 is a black, white, black pattern corresponding alignment pattern 430. Drawing 518 is a black, white, black, white, black pattern corresponding finder pattern 430.

In various embodiments, when scanning the image area for the template-image, a buffer-queue of dimensions (w−w',h') is kept in memory that will serve as a rolling window that keeps track of sum-of-difference calculations. In one example, the buffer is named $buffer_{x,y}$. Each entry in this buffer-queue will have 3 entries; one for each of the pattern types in the QR code finder pattern, named $sum_1$, $sum_2$, $sum_3$ for the respective patterns of: all black, black white black, and black white black white black.

An exemplary method will be further described. In order to perform a sliding-window approach to calculating the sum-of-differences values, for each row, the first sum-of-differences values for the three pattern types is pre-calculated. To determine the initial values of the three sum values, an operation analogous to an XOR of the row-type patterns against the first e bits of the image row is performed and sum the number of differences.

The buffer queue is then filled in the following fashion:
For each y from 0 to h:
    Pre-calculate $sum_1$, $sum_2$, $sum_3$
    For each x from 0 to w−e:
        $buffer_{x,y}$=[$sum_1$ $sum_2$ $sum_3$]
        If x=e then break loop
        $dx_1$=IMAGE$_{x,y}$−IMAGE$_{x+e,y}$
        $dx_2$=$dx_1$+2*(IMAGE$_{x+d,y}$−IMAGE$_{x+a,y}$)
        $dx_3$=$dx_2$+2*(IMAGE$_{x+b,y}$−IMAGE$_{x+c,y}$)
        $sum_1$=$sum_1$+$dx_1$
        $sum_2$=$sum_2$+$dx_2$
        $sum_3$=$sum_3$+$dx_3$ As the queue is filled, the minimum (x, y) coordinate is determined:
minsum=∞, e.g., the largest integer value that can be represented in the device or system implementing the method
minindex=nil, e.g., a predefined value used to indicate that a value for the parameter has not yet been determined
For each x from 0 to w−e:
    sum=0
    For each y from 0 to a−1: sum=sum+$buffer_{x,y}$[0]
    For each y from a to b−1: sum=sum+$buffer_{x,y}$[1]
    For each y from b to c−1: sum=sum+$buffer_{x,y}$[2]
    For each y from c to d−1: sum=sum+$buffer_{x,y}$[1]
    For each y from d to e−1: sum=sum+$buffer_{x,y}$[0]
    If sum<minsum:
        minsum=sum
        minindex=(x,y)

Figure 6:
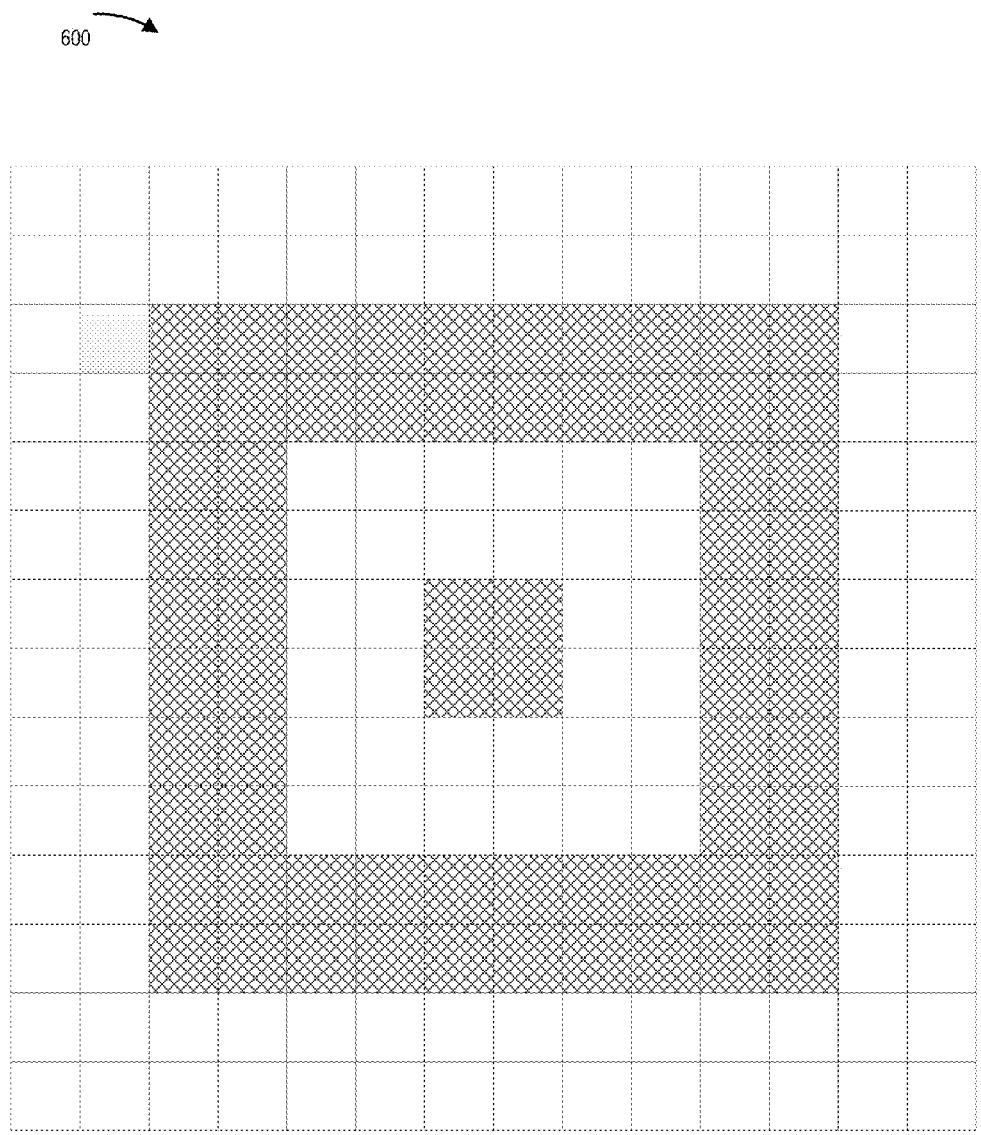
FIG. 6 illustrates an exemplary input image that may be tested for an alignment pattern in accordance with an exemplary embodiment.

An example implementing an exemplary method will be described below. FIG. 6 illustrates an exemplary input image 600 that may be processed to find the most likely location of an alignment pattern within the image. Exemplary input image 600 is a 14×14 pixel image. Further consider that in the example we will be searching for an alignment pattern within the input image 600. This simple image has been chosen for ease of calculation, but the same calculations are performed on much noisier images in practice. For the purposes of calculation, all black pixels will have a numerical value of 1 and all white pixels will have a numerical value of 0.

Further consider that input is received indicating that the module size is 2, so the {a, b, c, d, e} parameters are calculated to be {2, 4, 6, 8, 10} from the alignment pattern table above which indicates: a=1*modsize; b=2*modsize, c=3*modsize; d=4*modsize, e=5*midsize, where the variable modsize=module size. This corresponding to alignment pattern 430 of FIG. 4; therefore, our target pattern is alignment pattern 430.

Figure 7:
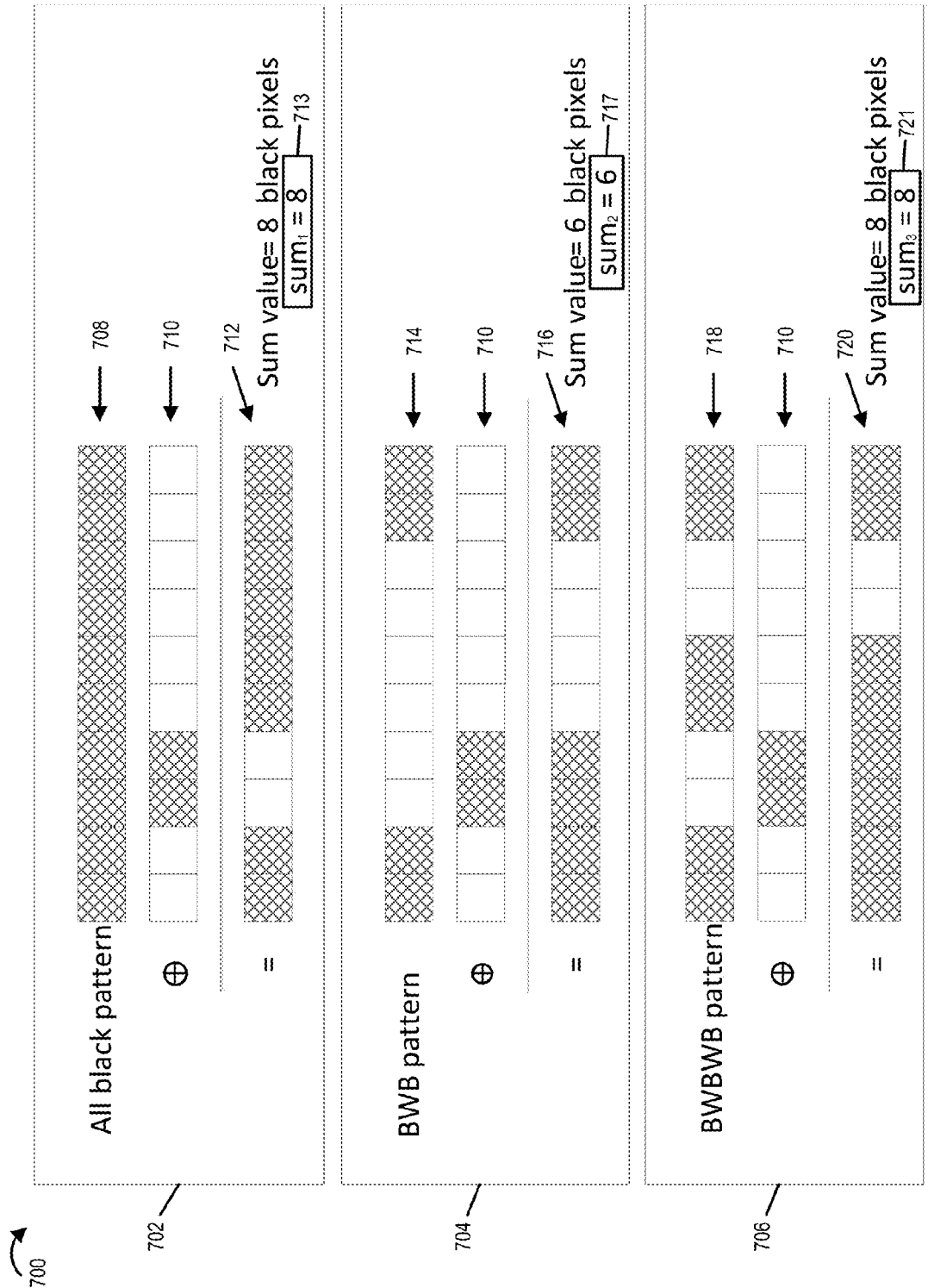
FIG. 7 illustrates an example, of pre-calculation of the three sum-of difference values for an example row of an input image in accordance with an example embodiment.

Our first step is to pre-calculate $sum_1$, $sum_2$, $sum_3$. Drawing 700 of FIG. 7 illustrates an example, of pre-calculation of the three sum-of difference values for an example row. The example row of the example of FIG. 7 is one of the fifth, sixth, eighth or ninth rows of input image 600 of FIG. 6. The 10 leftmost pixels of the example row of the input image are represented by drawing 710.

Box 702 illustrates the generation of $sum_1$ 713. In this example, black=1 and white=0. All black pattern 708 is exclusive ORed with input image pattern 710 resulting in pattern: black, black, white, white, black, black, black, black, black, black. The sum count of black pixels in pattern 712 is 8. Therefore, $sum_1$=8.

Box 704 illustrates the generation of $sum_2$ 717. Black white black pattern 714 is exclusive ORed with input image pattern 710 resulting in pattern: black, black, black, black, white, white, white, white, black, black. The sum count of black pixels in pattern 716 is 6. Therefore, $sum_2=6$.

Box 706 illustrates the generation of $sum_3$ 721. Black white black white black pattern 718 is exclusive ORed with input image pattern 710 resulting in pattern: black, black, black, black, white, black, black, white, white. The sum count of black pixels in pattern 720 is 8. Therefore, $sum_3=8$.

Given the highly repetitive nature of the example image 600 of FIG. 6, for the purposes of this example, the image is simplified to four rows that appear multiple times. The buffer-queue for each of these four rows is filled in the manner given in the pseudo-code above.

To calculate row 0, the sum pre-calculation step as described above is performed and it is determined that the initial values for sum are: $sum_1=10$, $sum_2=4$, $sum_3=6$. This is a first set of sums for the image row being processed.

Figure 8:
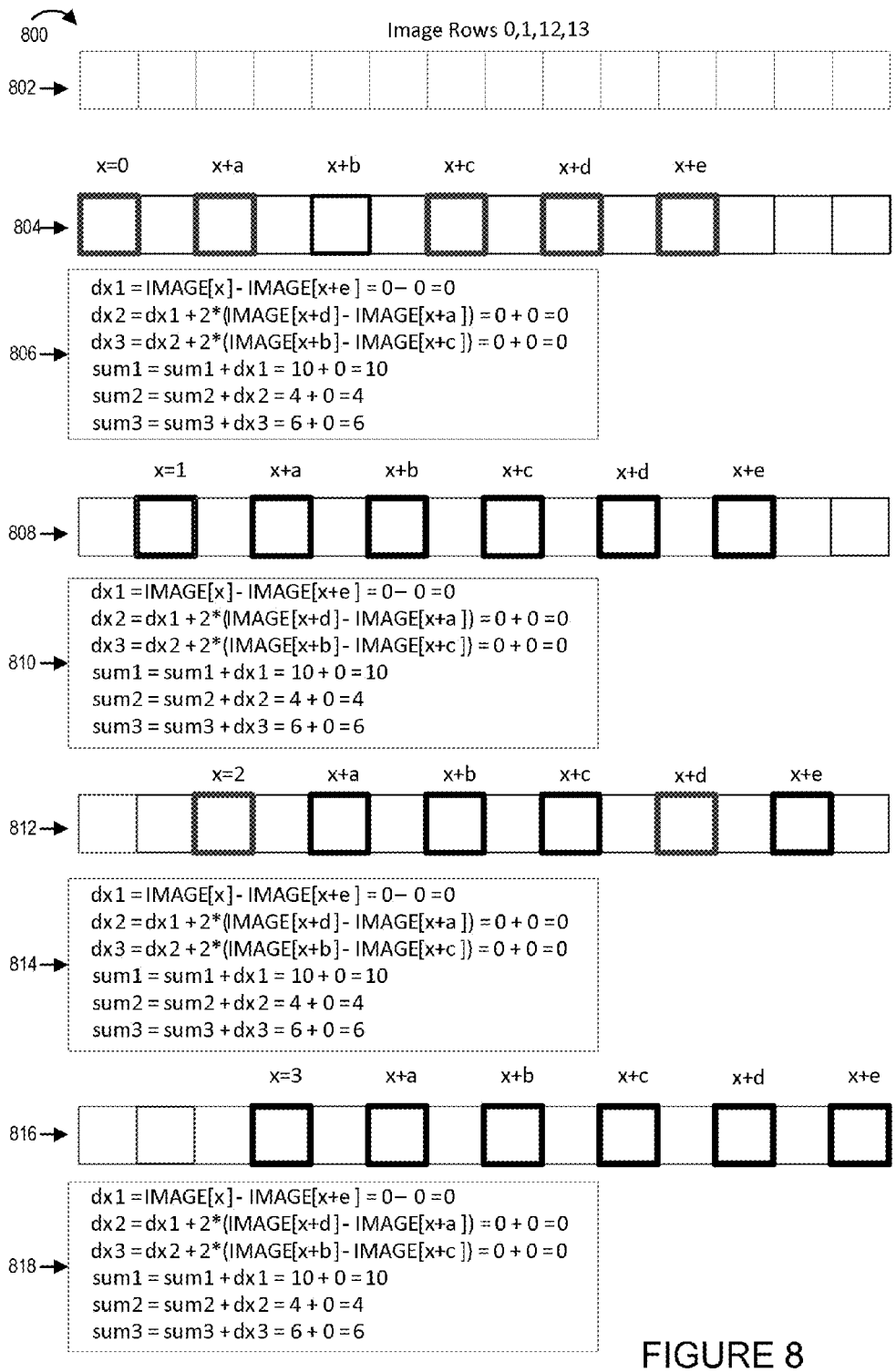
FIG. 8 illustrates calculations to generate additional sets of $sum_1$, $sum_2$, and $sum_3$ values for an input image row with the pattern: white, white, white, white, white, white, white, white, white, white, white, white, white, white.

Drawing 800 of FIG. 8 illustrates calculations to generate additional sets of $sum_1$, $sum_2$, and $sum_3$ values for an input image row 802 with the pattern: white, white, white, white, white, white, white, white, white, white, white, white, white. This row is any of the image rows 0, 1, 12, or 13 of input image 600 of FIG. 6.

Drawing 804 identifies pixels elements of the image used in the processing of box 806 to generate a second set of sums. Note that white=0 and black=1 with regard to the image pixels. The pre-calculated sums, which are the first set of sums for the row, are used as input in the calculations of box 806. The second set of sums, generated by the processing identified in box 806, are: $sum_1=10$, $sum_2=4$, $sum_3=6$.

Drawing 808 identifies pixels elements of the image used in the processing of box 810 to generate a third set of sums. The second set of sums, which were generated by the calculations of box 806, are used as input in the calculations of box 810. The third set of sums, generated by the processing identified in box 810, are: $sum_1=10$, $sum_2=4$, $sum_3=6$.

Drawing 812 identifies pixels elements of the image used in the processing of box 814 to generate a fourth set of sums. The third set of sums, which were generated by the calculations of box 810, are used as input in the calculations of box 814. The fourth set of sums, generated by the processing identified in box 814, are: $sum_1=10$, $sum_2=4$, $sum_3=6$.

Drawing 816 identifies pixels elements of the image used in the processing of box 814 to generate a fifth set of sums. The fourth set of sums, which were generated by the calculations of box 814, are used as input in the calculations of box 818. The fifth set of sums, generated by the processing identified in box 814, are: $sum_1=10$, $sum_2=4$, $sum_3=6$.

The calculations to obtain the sets of sums are extremely simple computations. The results show that for this example, the sum values remaining constant as x is iterated from left to right. At each iteration, the sum values are stored into a queue-buffer. These calculations, described above with respect to row 0 of input image 600 of FIG. 6, are performed identically for rows 1, 12 and 13. Note that rows 0, 1, 12, and 13 of input image 600 are identical.

Figure 9:
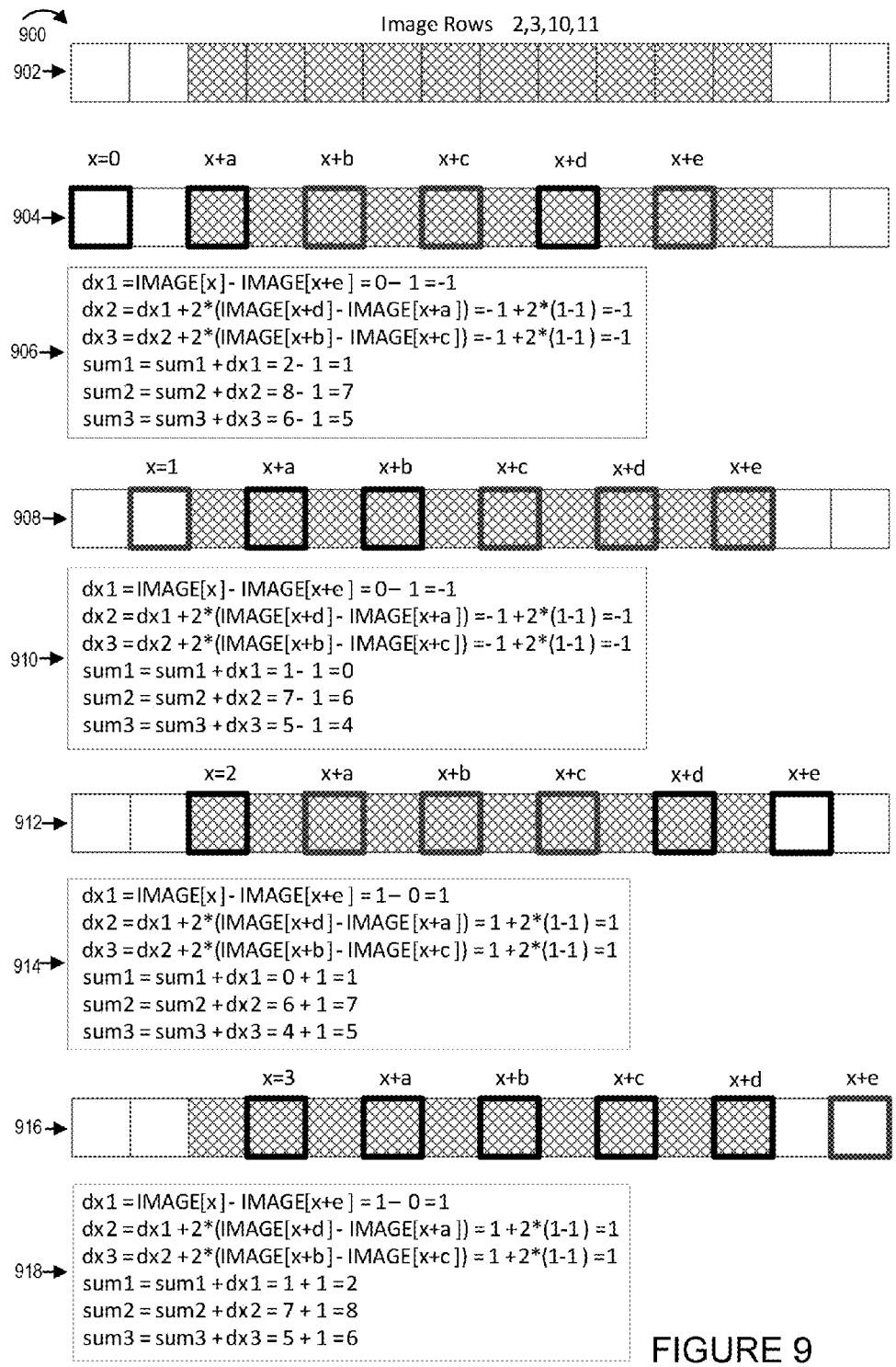
FIG. 9 illustrates calculations to generate additional sets of $sum_s$, $sum_2$, and $sum_3$ values for an input image row with the pattern: white, white, black, black, black, black, black, black, black, black, black, black, white, white.

Processing for rows 2, 3, 10 and 11 proceed in the same manner, but with a starting calculation of the sum variables, sometimes referred to as pre-calculated sums for the row, of: $sum_1=2$, $sum_2=8$, $sum_3=6$. Drawing 900 of FIG. 9 illustrates calculations to generate additional sets of $sum_1$, $sum_2$, and $sum_3$ values for an input image row 902 with the pattern: white, white, black, black, black, black, black, black, black, black, black, black, white, white. This row is any of the image rows 2, 3, 10, or 11 of input image 600 of FIG. 6.

Drawing 904 identifies pixels elements of the image used in the processing of box 906 to generate a second set of sums. Note that white=0 and black=1 with regard to the image pixels. The pre-calculated sums, which are the first set of sums for the row, are used as input in the calculations of box 806. The second set of sums, generated by the processing identified in box 906, are: $sum_1=1$, $sum_2=7$, $sum_3=5$.

Drawing 908 identifies pixels elements of the image used in the processing of box 910 to generate a third set of sums. The second set of sums, which were generated by the calculations of box 906, are used as input in the calculations of box 910. The third set of sums, generated by the processing identified in box 910, are: $sum_1=0$, $sum_2=6$, $sum_3=4$.

Drawing 912 identifies pixels elements of the image used in the processing of box 914 to generate a fourth set of sums. The third set of sums, which were generated by the calculations of box 910, are used as input in the calculations of box 914. The fourth set of sums, generated by the processing identified in box 914, are: $sum_1=1$, $sum_2=7$, $sum_3=5$.

Drawing 916 identifies pixels elements of the image used in the processing of box 918 to generate a fifth set of sums. The fourth set of sums, which were generated by the calculations of box 914, are used as input in the calculations of box 918. The fifth set of sums, generated by the processing identified in box 918, are: $sum_1=2$, $sum_2=8$, $sum_3=6$.

Figure 10:
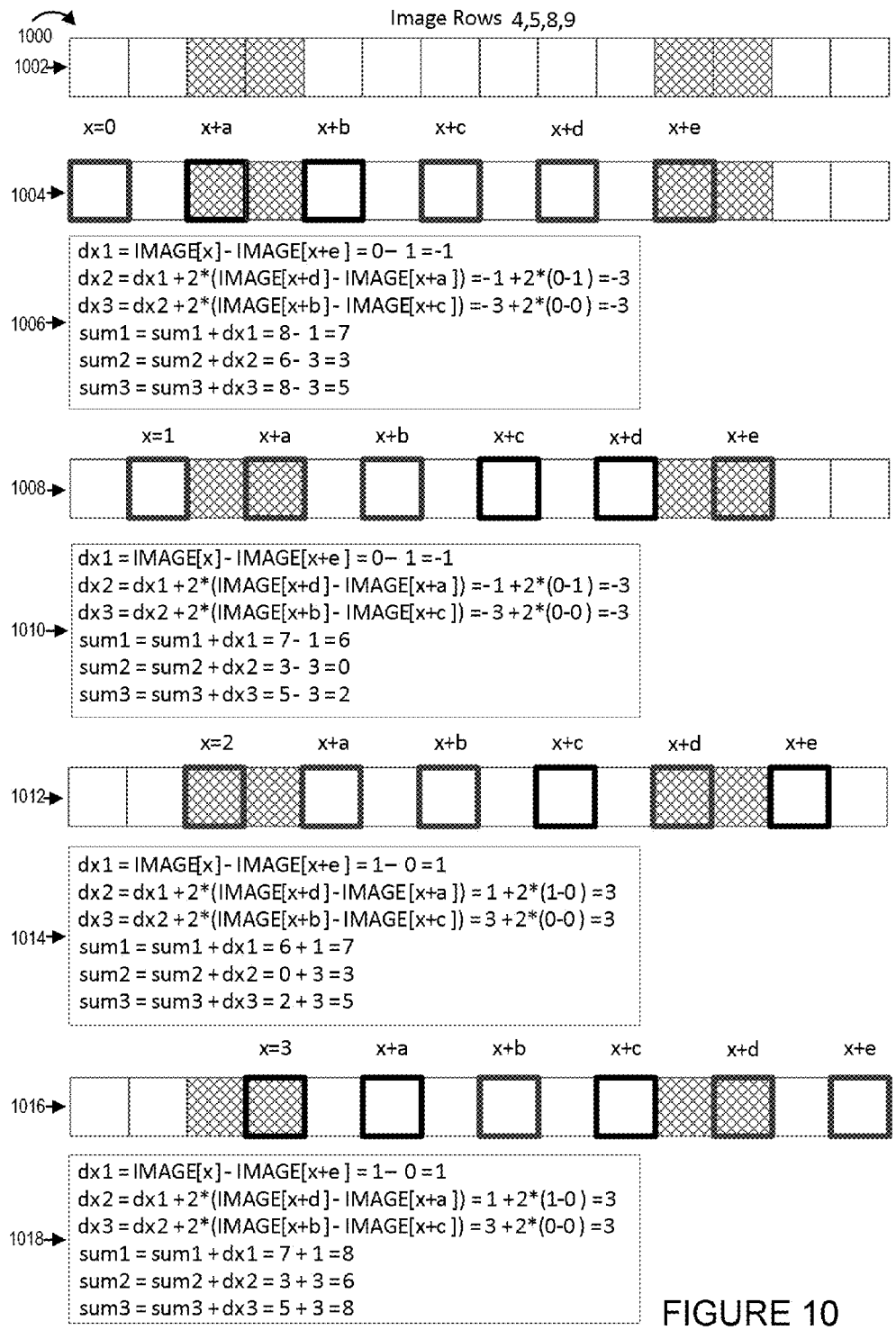
FIG. 10 illustrates calculations to generate additional sets of $sum_1$, $sum_2$, and $sum_3$ values for an input image row with the pattern: white, white, black, black, white, white, white, white, white, white, black, black, white, white.

Processing for rows 4, 5, 8 and 9 proceed in the same manner, but with a starting calculation of the sum variables, sometimes referred to as pre-calculated sums for the row, of: $sum_1=8$, $sum_2=6$, $sum_3=8$. Drawing 1000 of FIG. 10 illustrates calculations to generate additional sets of $sum_1$, $sum_2$, and $sum_3$ values for an input image row 1002 with the pattern: white, white, black, black, white, white, white, white, white, white, white, black, white, white. This row is any of the image rows 4, 5, 8, or 9 of input image 600 of FIG. 6.

Drawing 1004 identifies pixels elements of the image used in the processing of box 906 to generate a second set of sums. Note that white=0 and black=1 with regard to the image pixels. The pre-calculated sums, which are the first set of sums for the row, are used as input in the calculations of box 1006. The second set of sums, generated by the processing identified in box 1006, are: $sum_1=7$, $sum_2=3$, $sum_3=5$.

Drawing 1008 identifies pixels elements of the image used in the processing of box 1010 to generate a third set of sums. The second set of sums, which were generated by the calculations of box 1006, are used as input in the calculations of box 1010. The third set of sums, generated by the processing identified in box 1010, are: $sum_1=6$, $sum_2=0$, $sum_3=2$.

Drawing 1012 identifies pixels elements of the image used in the processing of box 1014 to generate a fourth set of sums. The third set of sums, which were generated by the calculations of box 1010, are used as input in the calculations of box 1014. The fourth set of sums, generated by the processing identified in box 1014, are: $sum_1=7$, $sum_2=3$, $sum_3=5$.

Drawing 1016 identifies pixels elements of the image used in the processing of box 1018 to generate a fifth set of sums. The fourth set of sums, which were generated by the calculations of box 1014, are used as input in the calculations of box 1018. The fifth set of sums, generated by the processing identified in box 1018, are: $sum_1=8$, $sum_2=6$, $sum_3=8$.

Figure 11:
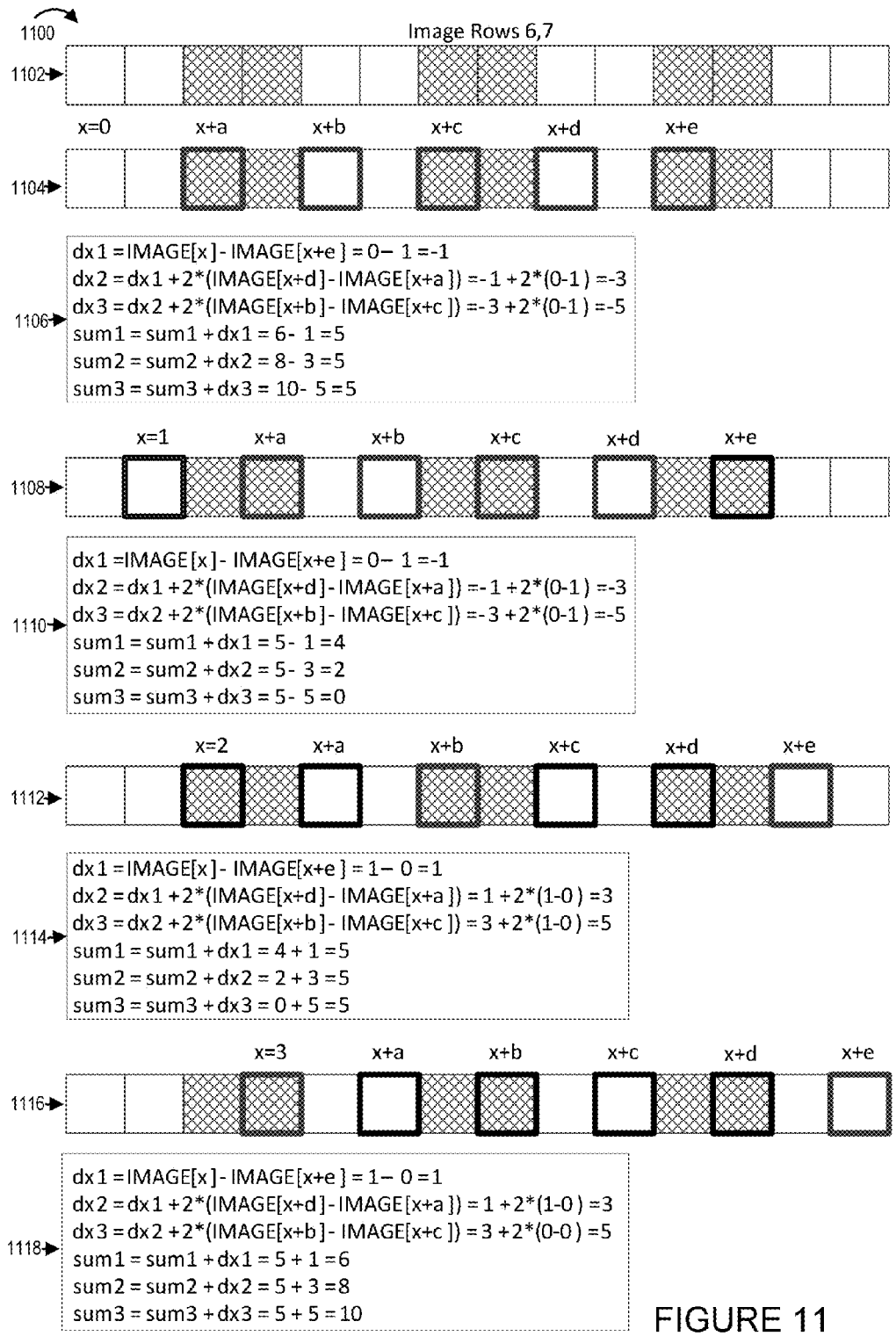
FIG. 11 illustrates calculations to generate additional sets of $sum_1$, $sum_2$, and $sum_3$ values for an input image row with the pattern: white, white, black, black, white, white, black, black, white, white, black, black, white, white.

Processing for rows 6 and 7 proceed in the same manner, but with a starting calculation of the sum variables, sometimes referred to as pre-calculated sums for the row, of: $sum_1=6$, $sum_2=8$, $sum_3=10$. Drawing 1100 of FIG. 11 illustrates calculations to generate additional sets of $sum_1$, $sum_2$, and $sum_3$ values for an input image row 1102 with the pattern: white, white, black, black, white, white, black, black, white, white, black, black, white, white. This row is any of the image rows 6 or 7 of input image 600 of FIG. 6.

Drawing 1104 identifies pixels elements of the image used in the processing of box 1106 to generate a second set of sums. Note that white=0 and black=1 with regard to the image pixels. The pre-calculated sums, which are the first set of sums for the row, are used as input in the calculations of box 1106. The second set of sums, generated by the processing identified in box 1106, are: $sum_1=5$, $sum_2=5$, $sum_3=5$.

Drawing 1108 identifies pixels elements of the image used in the processing of box 1110 to generate a third set of sums. The second set of sums, which were generated by the calculations of box 1106, are used as input in the calculations of box 1110. The third set of sums, generated by the processing identified in box 1110, are: $sum_1=4$, $sum_2=2$, $sum_3=0$.

Drawing 1112 identifies pixels elements of the image used in the processing of box 1114 to generate a fourth set of sums. The third set of sums, which were generated by the calculations of box 1110, are used as input in the calculations of box 1114. The fourth set of sums, generated by the processing identified in box 1114, are: $sum_1=5$, $sum_2=5$, $sum_3=5$.

Drawing 1116 identifies pixels elements of the image used in the processing of box 1118 to generate a fifth set of sums. The fourth set of sums, which were generated by the calculations of box 1114, are used as input in the calculations of box 1118. The fifth set of sums, generated by the processing identified in box 1118, are: $sum_1=6$, $sum_2=8$, $sum_3=10$.

The sum calculations on each of the 14 rows of the source image 600 of FIG. 6 have been performed. FIG. 12 illustrates the queue-buffer 1200 including stored sets of {sum1, sum2, sum3} values. It is stored as a 14×5 matrix of $sum_1$, $sum_2$, $sum_3$ values, respectively. A likely location of the alignment pattern template within the source image is determined based on the sum calculations of queue-buffer 1200.

It should be noted that in this described example is the entire 14×5 matrix in memory at once. In some embodiments, the queue contains less elements. For example, in some embodiments, in practice, the queue will begin trimming rows to maintain at most 'e' row. When this threshold is reached, the final sum-of-differences value for the full set of pixels can begin to be calculated. To do this, descend vertically down each row and for each range of y sum together in the range of the a to e parameters, the buffer entry's $sum_1$, $sum_2$, $sum_3$, $sum_2$, $sum_1$ values respectively.

Figure 13:
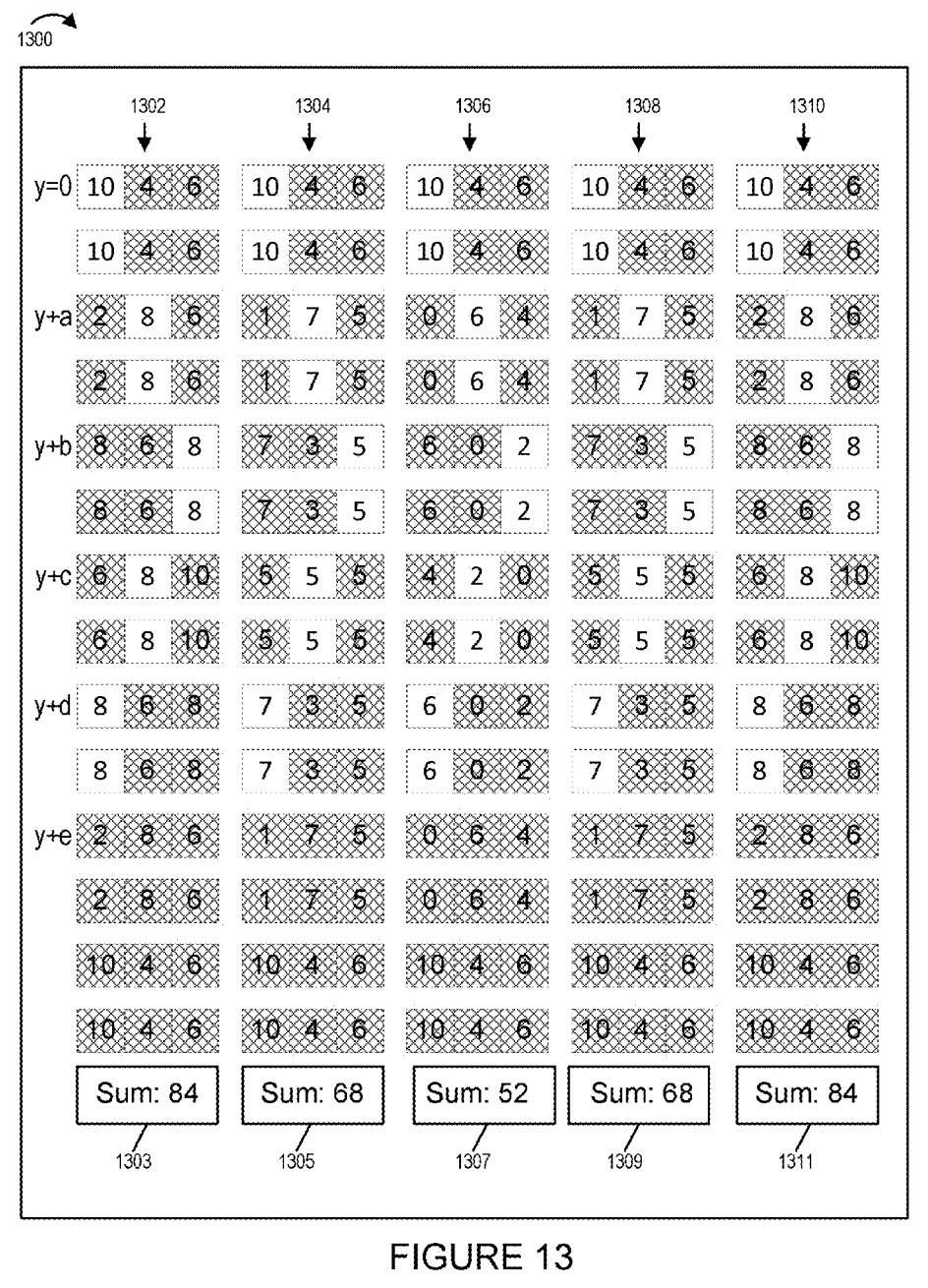

FIG. 13 includes a drawing 1300 illustrating calculating final sum values from entries within queue-buffer 1200. A first final sum-of-differences value 1303 is generated from the elements in column 1302 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+10+8+8+8+8+8+8+8+8=84.

A second final sum-of-differences value 1305 is generated from the elements in column 1304 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+10+7+7+5+5+5+5+7+7=68.

A third final sum-of-differences value 1307 is generated from the elements in column 1306 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+10+6+6+2+2+2+2+6+6=52.

A fourth final sum-of-differences value 1309 is generated from the elements in column 1308 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+10+7+7+5+5+5+5+7+7=68.

A fifth final sum-of-differences value 1310 is generated from the elements in column 1310 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+10+8+8+8+8+8+8+8+8=84.

Figure 14:
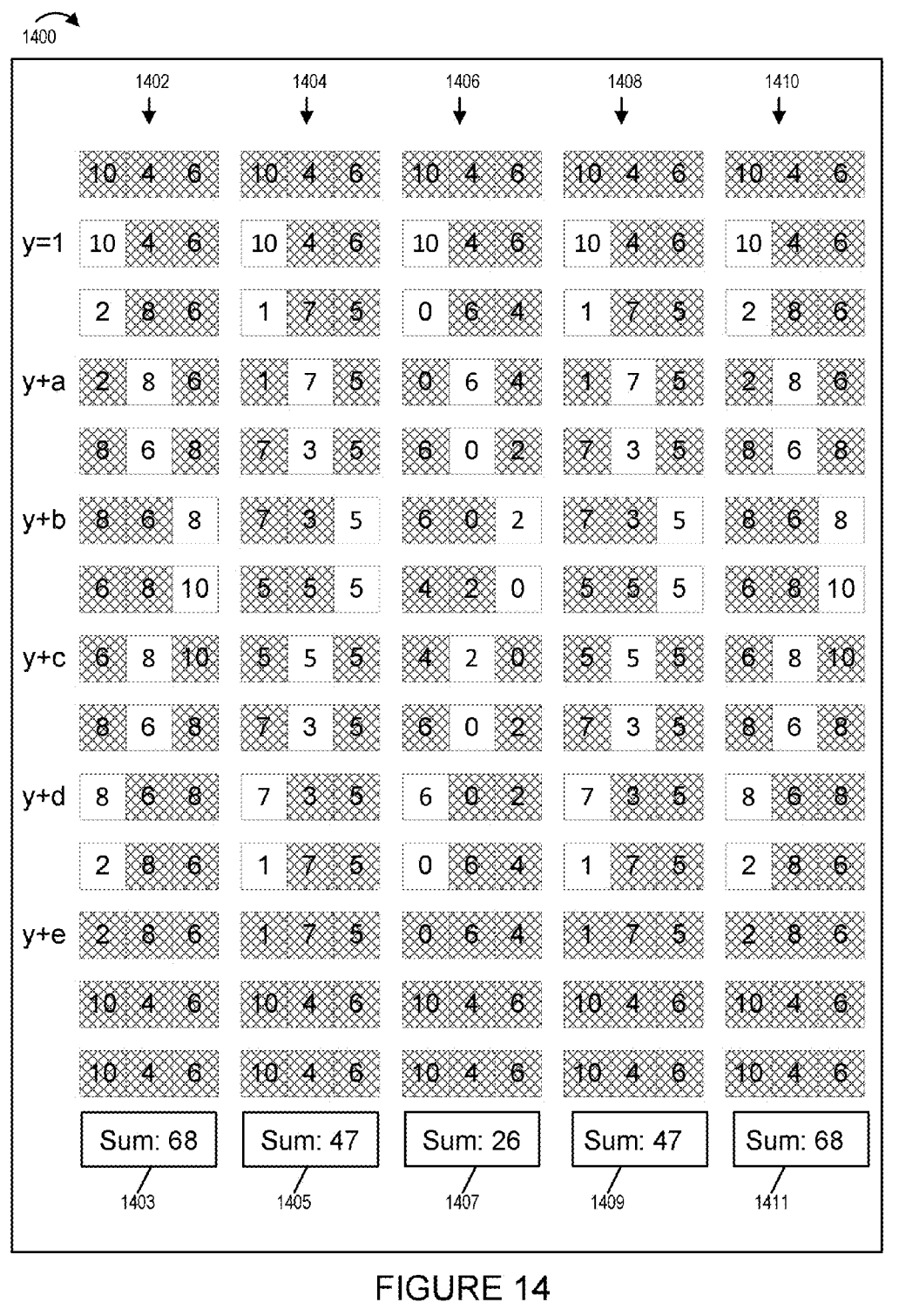

FIG. 14 includes a drawing 1400 illustrating calculating final sum values from entries within queue-buffer 1200. A sixth final sum-of-differences value 1403 is generated from the elements in column 1402 with no shading. Note that these elements with no shading correspond to buffer entries for: $sum_1$, $sum_1$, $sum_2$, $sum_2$, $sum_3$, $sum_3$, $sum_2$, $sum_2$, $sum_s$, $sum_1$, respectively. Sum=10+2+8+6+8+10+8+6+8+2=68.

A seventh final sum-of-differences value 1405 is generated from the elements in column 1404 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+1+7+3+5+5+5+3+7+1=47.

An eight final sum-of-differences value 1407 is generated from the elements in column 1406 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+0+6+0+2+0+2+0+6+0=26.

A ninth final sum-of-differences value 1409 is generated from the elements in column 1408 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+1+7+3+5+5+5+3+7+1=47.

A tenth final sum-of-differences value 1411 is generated from the elements in column 1410 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=10+2+8+6+8+10+8+6+8+2=68.

Figure 15:
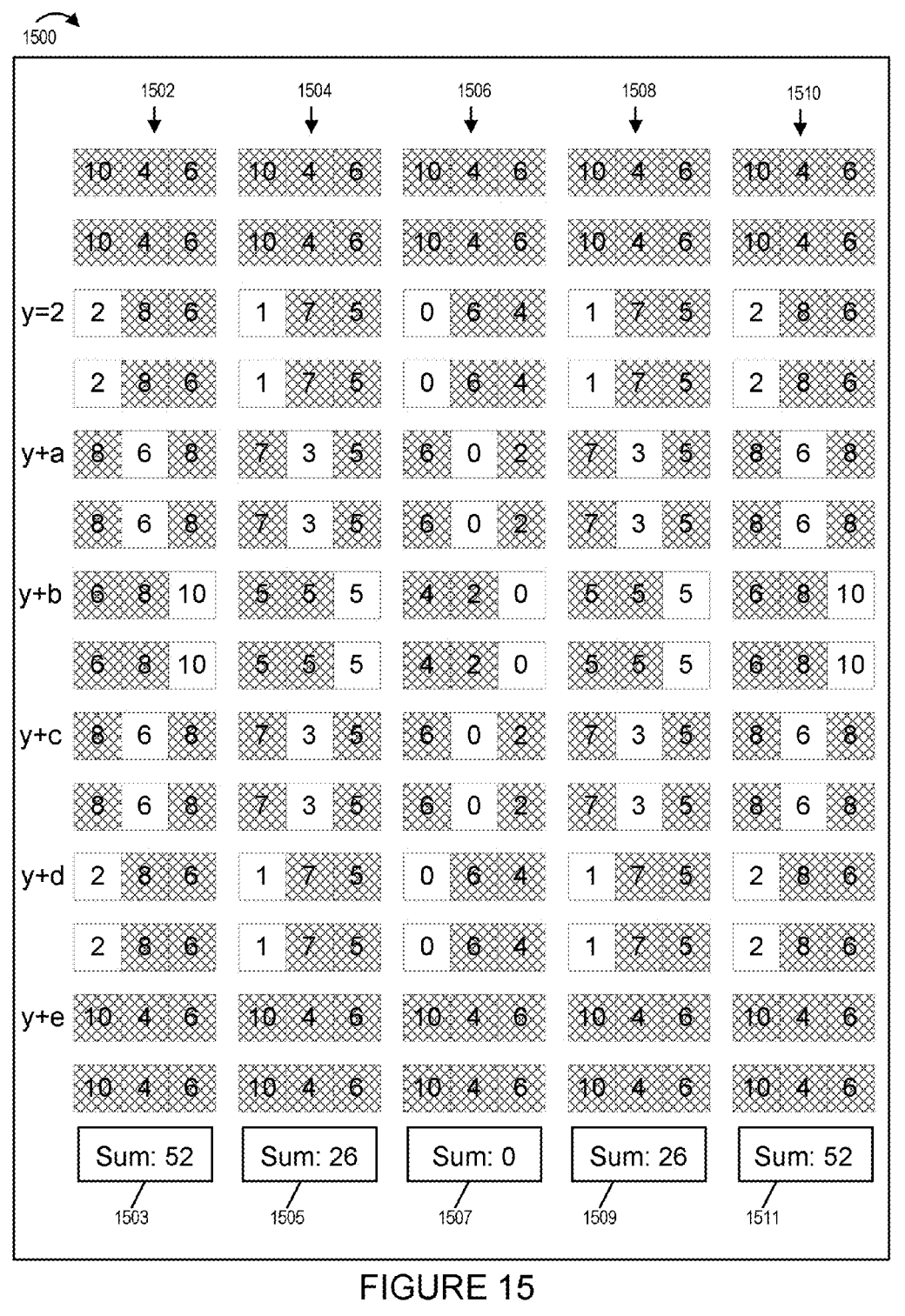

FIG. 15 includes a drawing 1500 illustrating calculating final sum values from entries within queue-buffer 1200. An eleventh final sum-of-differences value 1503 is generated from the elements in column 1502 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=2+2+6+6+10+10+6+6+2+2=52.

A twelfth final sum-of-differences value 1505 is generated from the elements in column 1504 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=1+1+3+3+5+5+3+3+1+1=26.

A thirteenth final sum-of-differences value 1507 is generated from the elements in column 1506 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=0+0+0+0+0+0+0+0+0+0=0.

A fourteenth final sum-of-differences value 1509 is generated from the elements in column 1508 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=1+1+3+3+5+5+3+3+1+1=26.

A fifteenth final sum-of-differences value 1511 is generated from the elements in column 1510 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=2+2+6+6+10+10+6+6+2+2=52.

Figure 16:
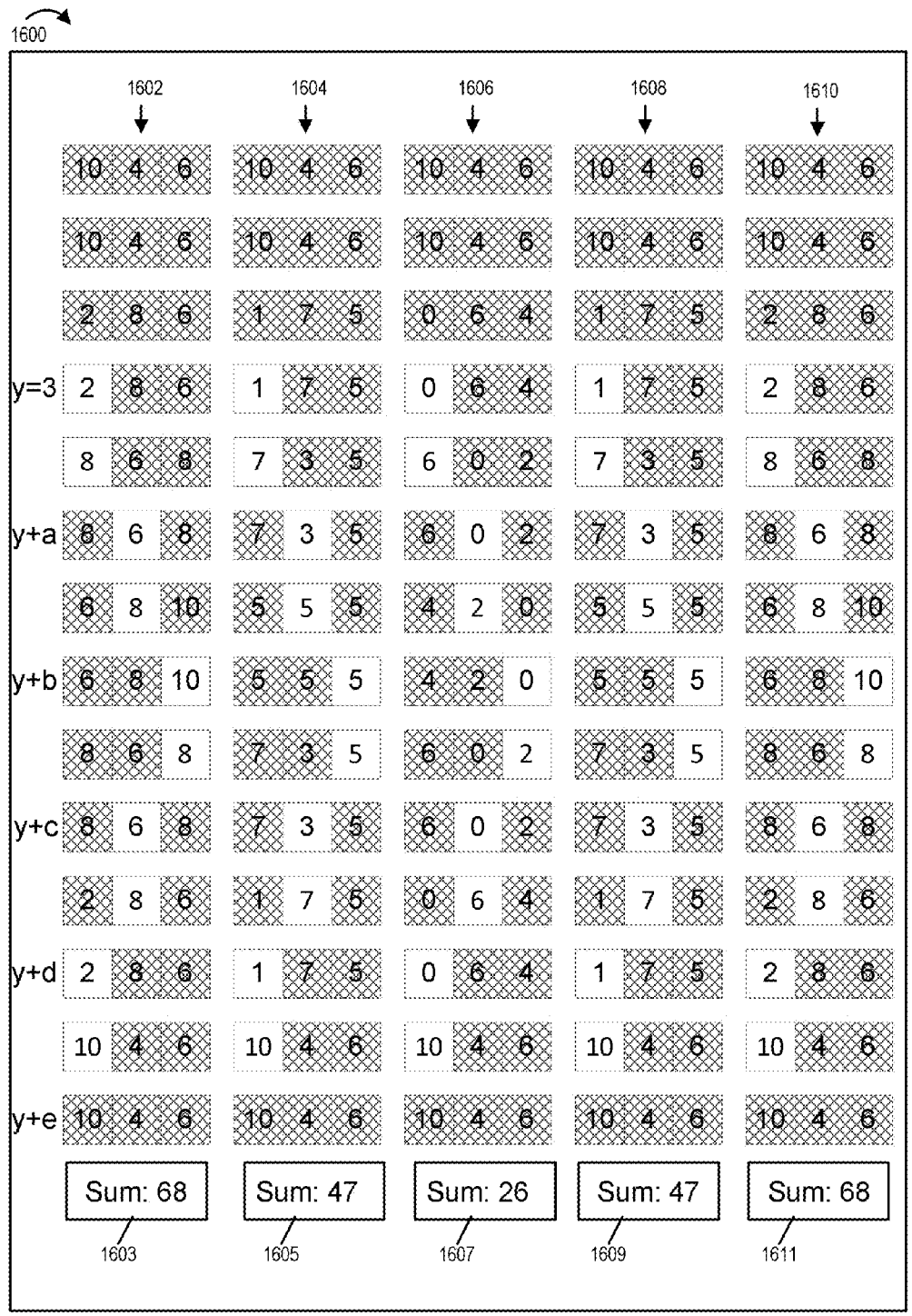
FIG. 16 includes a drawing illustrating calculating additional final sum values from entries within queue-buffer of FIG. 12.

FIG. 16 includes a drawing 1600 illustrating calculating final sum values from entries within queue-buffer 1200. A sixteenth final sum-of-differences value 1603 is generated from the elements in column 1602 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=2+8+6+8+10+8+6+8+2+10=68.

A seventeenth final sum-of-differences value 1605 is generated from the elements in column 1604 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=1+7+3+5+5+5+3+7+1+10=47.

An eighteenth final sum-of-differences value 1607 is generated from the elements in column 1606 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=0+6+0+2+0+2+0+6+0+10=26.

A nineteenth final sum-of-differences value 1609 is generated from the elements in column 1608 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=1+7+3+5+5+5+3+7+1+10=47.

A twentieth final sum-of-differences value 1611 is generated from the elements in column 1610 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=2+8+6+8+10+8+6+8+2+10=68.

Figure 17:
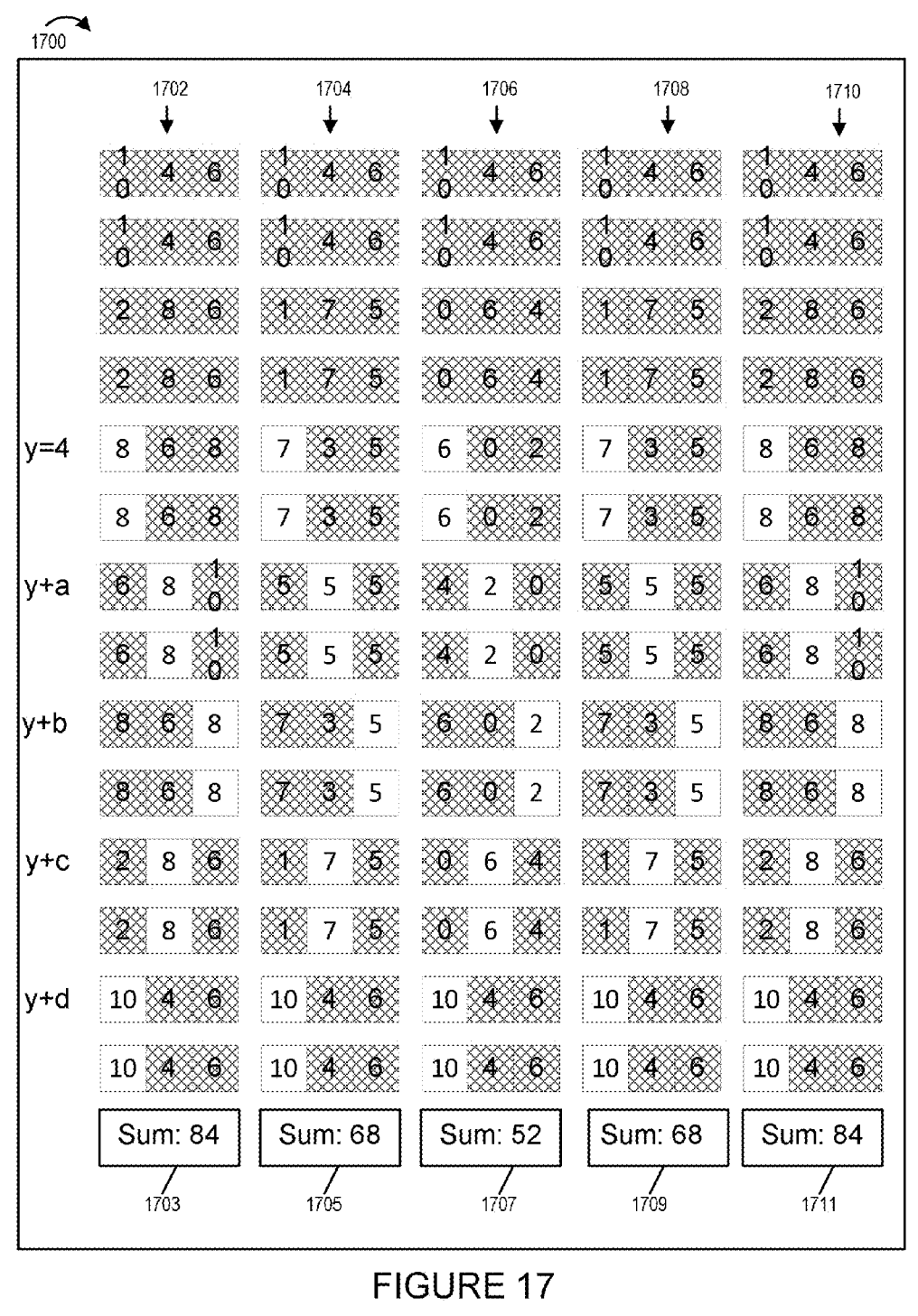

FIG. 17 includes a drawing 1700 illustrating calculating final sum values from entries within queue-buffer 1200. A twenty-first final sum-of-differences value 1703 is generated from the elements in column 1702 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=8+8+8+8+8+8+8+8+10+10=84.

A twenty-second final sum-of-differences value 1705 is generated from the elements in column 1704 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=7+7+5+5+5+5+7+7+10+10=68.

A twenty-third final sum-of-differences value 1707 is generated from the elements in column 1706 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=6+6+2+2+2+2+6+6+10+10=52.

A twenty-fourth final sum-of-differences value 1709 is generated from the elements in column 1708 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=7+7+5+5+5+5+7+7+10+10=68.

A twenty-fifth final sum-of-differences value 1711 is generated from the elements in column 1710 with no shading. Note that these elements with no shading correspond to buffer entries for: $sum_1$, $sum_1$, $sum_2$, $sum_2$, $sum_3$, $sum_3$, $sum_2$, $sum_2$, $sum_1$, $sum_1$, respectively. Sum=8+8+8+8+8+8+8+8+10+10=84.

FIG. 18 is a 5×5 matrix 1800 of final sums representing a composite of the sums of FIGS. 13, 14, 15, 16, and 17. Each position of a final sum within the matrix 1800 corresponds to a possible location of the target alignment pattern within the input image 600. When examining the final resultant 5×5 matrix, the lowest value occurs at the base-0 offset coordinate of (2, 2). This illustrates that the best fit location for the target alignment pattern which was being searched occurs at this pixel, and indeed with a value of 0, this means an exact match for the pattern was found. It should be noted that in this contrived and simple example of FIG. 6-18, the novel method of this exemplary embodiment performed approximately 22.4% of the pixel operations that an equivalent naïve method, e.g., a prior art method, would have performed. In larger examples, e.g., where the search area is larger in comparison to the target size, this value, representing the ratio of pixel operations using the novel method as compared to the number of pixel operation using a prior art method typically tends to fall well under 1%.

Figure 19:
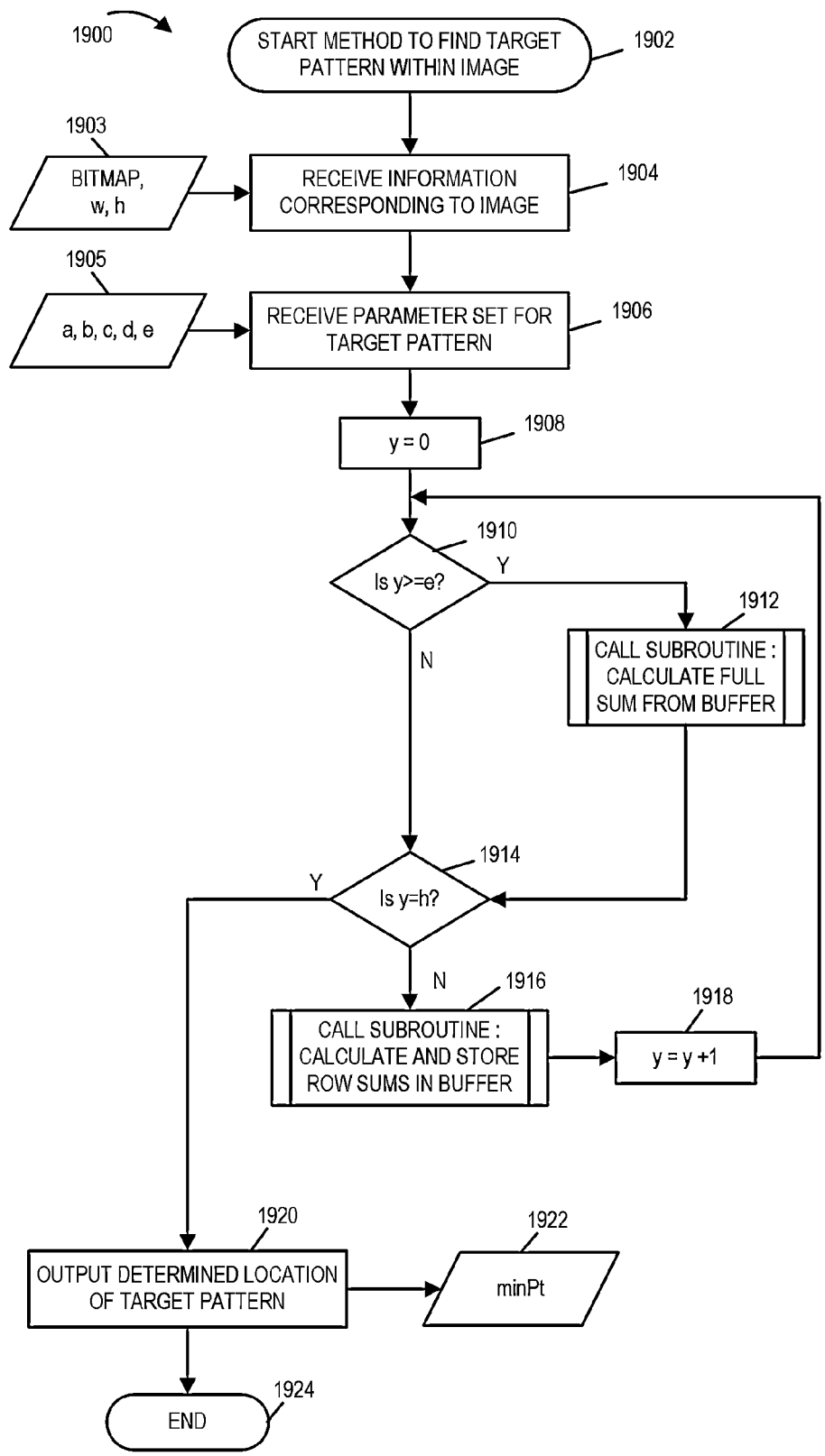
FIG. 19 is a flowchart of an exemplary method of operating a module within a device to find a target pattern within an image.

FIG. 19 is a flowchart 1900 of an exemplary method of operating a module within a device to find a target pattern within an image. The module implementing the method of flowchart 1900 is, e.g., a pattern location determination module. The module may be implemented in hardware, software, or a combination of hardware and software. In some embodiments, the device is a stationary personal computer, e.g., a desktop PC. In some embodiments, the device is a portable handheld battery powered mobile device. Operation of the exemplary method of finding a target pattern within an image starts in step 1902 where the module is initialized. Operation proceeds from start step 1902 to 1904, in which the module receives information 1903 corresponding to an image. The received image information 1903 includes a BITMAP corresponding to the image with a 1 or 0 value corresponding to the each pixel of the image, where 1 represents black and 0 represents white. The received image information also includes a value w representing the width of the image, e.g., the number of pixels of the width of the image, and a value h representing the height of the image, e.g., the number of pixels of the height of the image. Operation proceeds from step 1904 to step 1906.

In step 1906 the module receives a parameter set {a, b, c, d, e} values 1905 for the target pattern. In various embodiments, the target pattern is one of a QR finder pattern and a QR alignment pattern. In various embodiments, the target pattern set is a set of transition boundaries. Exemplary target pattern set parameters are given in the examples of FIG. 4. Operation proceeds from step 1906 to step 1908.

In step 1908 variable y is initialized to zero. The variable y in flowchart 1900 is a row counter used to move through each row of the image. Operation proceeds from step 1908 to step 1910. In step 1910 the module determines if y is greater than or equal to e. If y is greater than or equal to e, then operation proceeds from step 1910 to step 1912; otherwise operation proceeds from step 1910 to step 1914. Returning to step 1912, in step 1912 the module calls the subroutine: Calculate Full Sum From Buffer. Flowchart 1900 of FIG. 19 is a flowchart used to implement the subroutine Calculate Full Sum From Buffer. When operation returns from the Calculate Full Sum From Buffer Subroutine, operation proceeds to step 1914.

In step 1914, the module checks to determine if y=h. If y=h then each of the rows of the input image has been processed and operation proceeds from step 1914 to step 1920. In step 1920, the module outputs the determined location of the target pattern, minPt 1922. Operation proceeds from step 1920 to step 1924. In some embodiments, operation proceeds from step 1920 to step 1906 to search for another target pattern, e.g., another type of target pattern, within the same image. In some embodiments, operation proceeds from step 1920 to step 1904 to search for a target pattern within another image.

Figure 20:
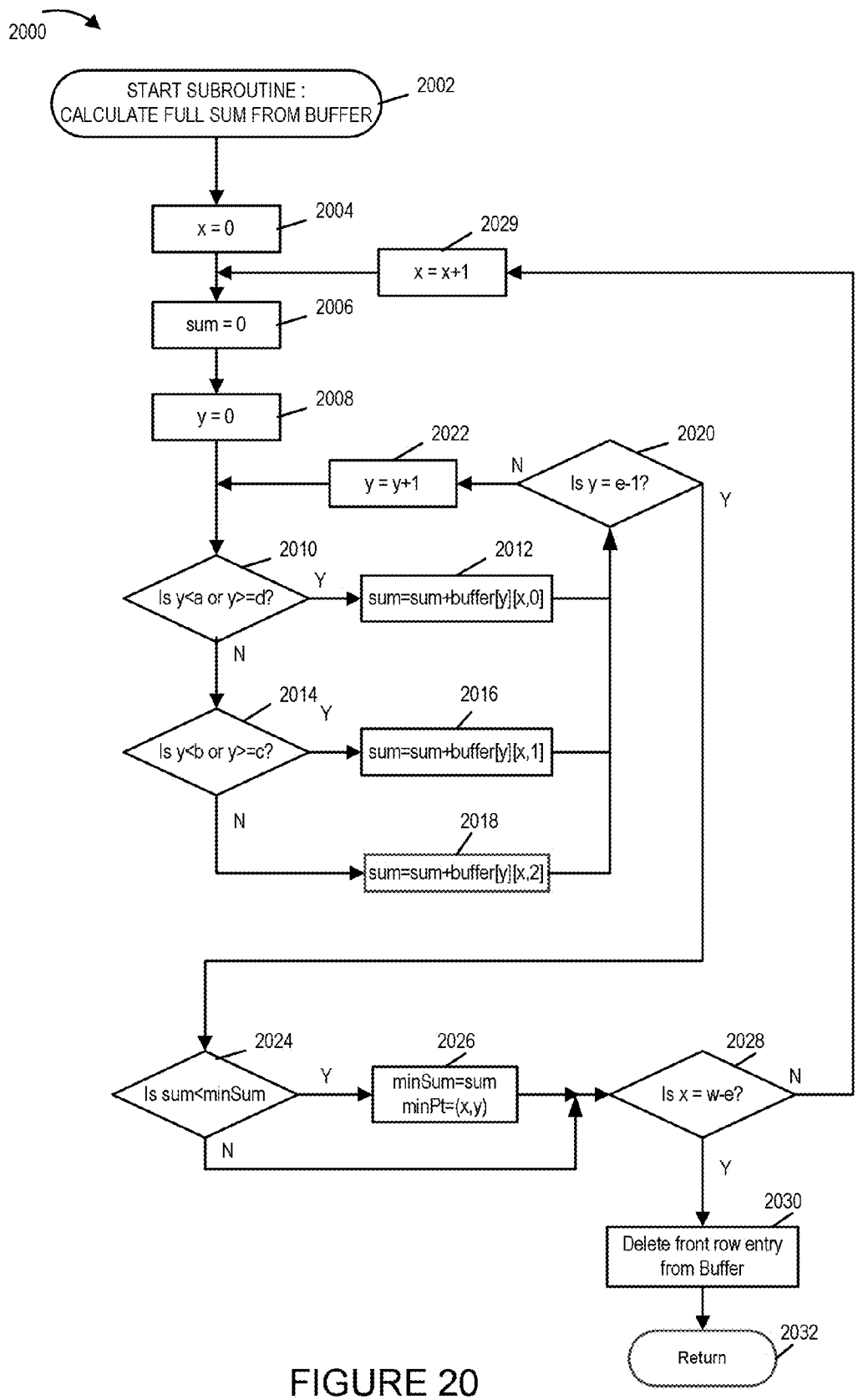
FIG. 20 is a flowchart an exemplary method of generating sum values corresponding to possible alternative locations of a target pattern within an image and identifying a likely possible location of the target.

Returning to step 1914, if in step 1914 y is not equal to h, then operation proceeds from step 1914 to step 1916 since the module has additional image rows to process. In step 1916 the module calls subroutine: Calculate and Store Row Sums in Buffer. Flowchart 2000 of FIG. 20 is a flowchart used to implement the subroutine Calculate and Store Row Sums in Buffer. When operation returns from the subroutine: Calculate and Store Row Sums in Buffer then, operation proceeds from step 1916 to step 1918. In step 1918 the row counter y is incremented, y=y+1. Operation proceeds from step 1918 to step 1910.

FIG. 20 is a flowchart 2000 of exemplary method of subroutine: Calculate Full Sum From Buffer, which may be implemented by the a module within a device. In some embodiments, the module implementing the method of flowchart 2000 is the same module implementing the method of flowchart 1900 of FIG. 19. In some embodiments, the module implementing the method of flowchart 2000 is a sub-module of the module implementing the method of flowchart 1900 of FIG. 19. Operation of the exemplary method starts in step 2002 and proceeds to step 2004. In step 2004 variable x is set equal to 0. Variable x in flowchart 2000 is a column counter of a Buffer in which sets of sums are stored. Operation proceeds from step 2004 to step 2006 in which the variable sum is set equal to 0. Then operation proceeds from step 2006 to step 2008. In step 2008 the variable y is set equal to 0. Variable y in flowchart 2000 is a row counter used to count through rows of the target pattern. Operation proceeds from step 2008 to step 2010.

In step 2010 the module checks if y is less than a or greater than or equal to d. If either of those conditions are satisfied, then operation proceeds from step 2010 to step 2012; otherwise operation proceeds from step 2010 to step 2014. Returning to step 2012, in step 2012 the value of the element buffer [y][x,0] is added to the current value of sum. Thus in step 2012 the following is performed: sum=sum+buffer[y][x,0]. Operation proceeds from step 2012 to step 2020.

Returning to step 2014, in step 2014 the module checks if the variable y is less than b or greater than or equal to c. If either of those conditions are satisfied, then operation proceeds from step 2014 to step 2016; otherwise operation proceeds from step 2014 to step 2018. In step 2016 the value of the element buffer[y][x,1] is added to the current value of sum. Thus in step 2016 the following is performed: sum=sum+buffer[y][x,1]. Operation proceeds from step 2014 to step 2020.

Returning to step 2018, in step 2016 the value of the element buffer[y][x,2] is added to the current value of sum. Thus in step 2018 the following is performed: sum=sum+buffer[y] [x,2]. Operation proceeds from step 2018 to step 2020.

In step 2020 a check is made to determine if y is equal to e−1. If it is determined that y=e−1, then operation proceeds from step 2020 to step 2024; otherwise, operation proceeds from step 2020 to step 2022 in which the pattern row counter y is incremented by 1. Operation proceeds from step 2022 to step 2010.

Returning to step 2024, in step 2024 the module checks if sum<minSum. If the test of step 2024 indicates that sum is less than minSum, then operation proceeds from step 2024 to step 2026; otherwise operation proceeds from step 2024 to step 2028. Returning to step 2026, in step 2026 the current value of minSum is replaced by the value of sum. Thus in step 2026, the following is performed: minSum=sum. In step 2026 the coordinates corresponding to the new minSum are also recorded. In step 2026, the following is also performed: minPt=(x,y). Operation proceeds from step 2026 to step 2028.

In various embodiments, minSum and minPt are global variables used by both flowchart 1900 and flowchart 2000 and the variables minSum was initialized at the start of flowchart 1900, e.g., minSum was set initially to a value which would exceed any generated sum input to step 2024.

In step 2028 the module tests if the buffer column counter x is equal to w−e. If it is determined in step 2028 that x=w−e then, operation proceeds from step 2028 to step 2030; otherwise operation proceeds from step 2028 to step 2029 in which the buffer column counter x is incremented by 1.

Returning to step 2030, in step 2030 the module deletes the front row entry from the Buffer. Operation proceeds from step 2030 to return step 2032.

Figure 21:
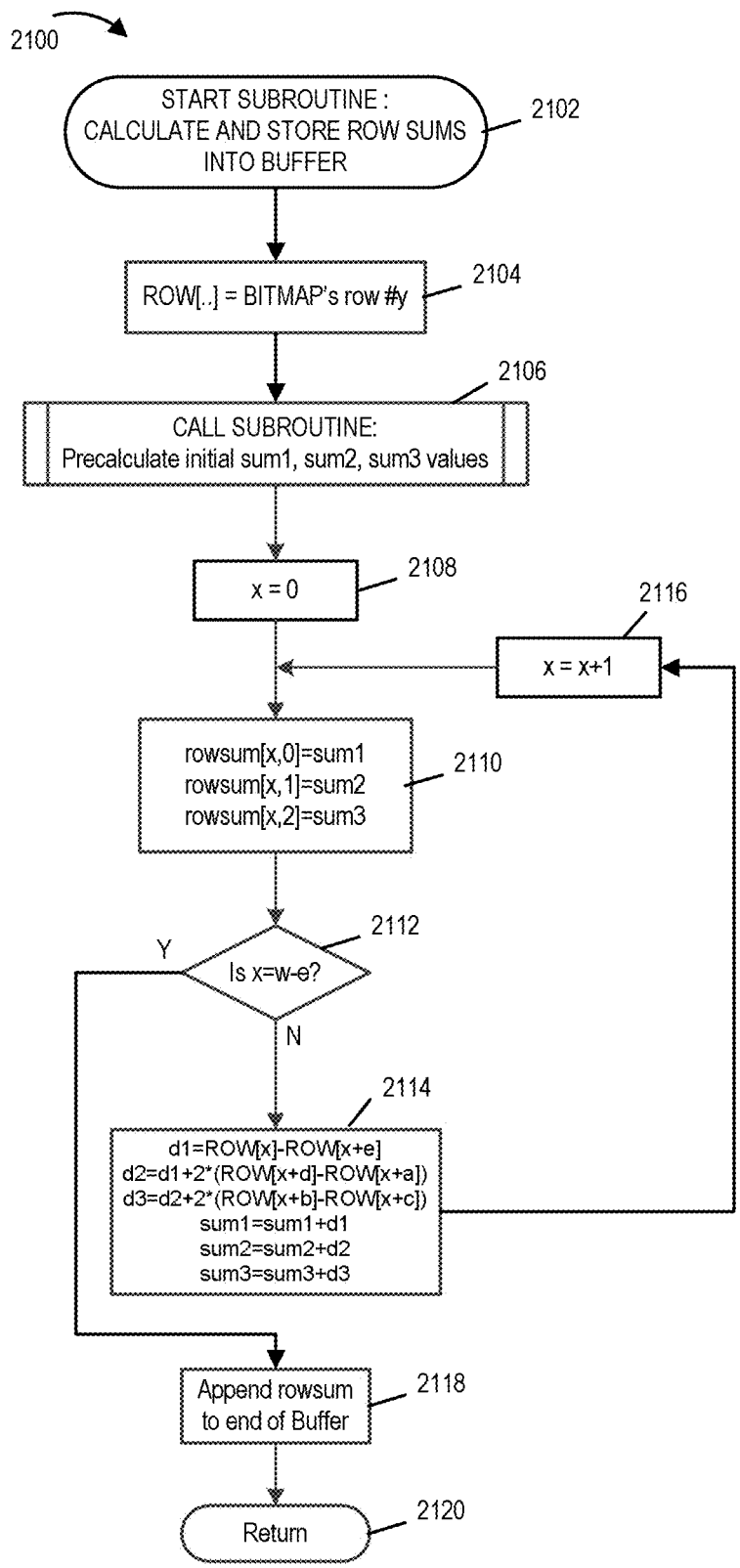
FIG. 21 is a flowchart of exemplary method of calculating and storing sets of sums for a row into a buffer.

FIG. 21 is a flowchart 2100 of exemplary method of subroutine: Calculate and Store Row Sums into Buffer, which may be implemented by a module within a device. In some embodiments, the module implementing the method of flowchart 2100 is the same module implementing the method of flowchart 1900 of FIG. 19. In some embodiments, the module implementing the method of flowchart 2100 is a sub-module of the module implementing the method of flowchart 1900 of FIG. 19. Operation of the exemplary method starts in step 2102 and proceeds to step 2104. In step 2104 the BITMAP values of the input image of row y of the input image are put into the array Row[ . . . ]. The value of y is an input to the subroutine when the subroutine is called. Thus in step 2104, the following is performed: ROW[ . . . ]=Bitmaps's of row # y. Operation proceeds from step 2104 to 2106. In step 2106, a call is performed to Subroutine: Precalulate Initial sum 1, sum2, sum3 values. Step 2106 returns a set of sum values (sum1, sum2, sum3) which are the first set for the row being processed. Operation proceeds from step 2106 to step 2108.

In step 2108, column row counter x of the Buffer is set equal to 0. Thus in step 2108 the following is performed x=0. Operation proceeds from step 2108 to step 2110. In step 2110 current values for sum1, sum2, and sum3 are stored. In step 2110 the following is performed: row[x,0]=sum1; row[x, 1]=sum 2; and row[x,2]=sum 3. Operation proceeds from step 2110 to step 2112.

In step 2112 a check is performed to determine if the Buffer row counter x equals w−e. If the check indicates that x is not equal to w−e, then, there are additional sets of rowsums to be calculated for the row and operation proceeds from step 2112 to step 2114. In step 2114 a new set of 3 sum values is calculated using the previously calculated set of sum values and some of the bitmap values corresponding to particular locations in the row of the image. In step 2114 the following calculations are performed: d1=ROW[x]−ROW[x+e]; d2=d1+2*(ROW[x+d]−ROW[x+a]); d3=d2+2*(ROW[x+b]−ROW[x+c]); sum1=sum1+d1; sum2=sum2+d2; and sum3=sum3+d3. Operation proceeds from step 2114 to step 2116 in which the buffer row counter x is incremented by 1. Operation proceeds from step 2116 to step 2110.

Returning to step 2112, if in step 2112 it is determined that x=w−e, then the calculations for the sets of sums for the image row y being processed has completed, and operation proceeds from step 2112 to step 2118, where the sets of rowsum values are appended to the end of the Buffer. Thus step 2118 stores the sets of calculated sets of rowsums in the Buffer. Operation proceeds from step 2118 to return step 2120.

Figure 22:
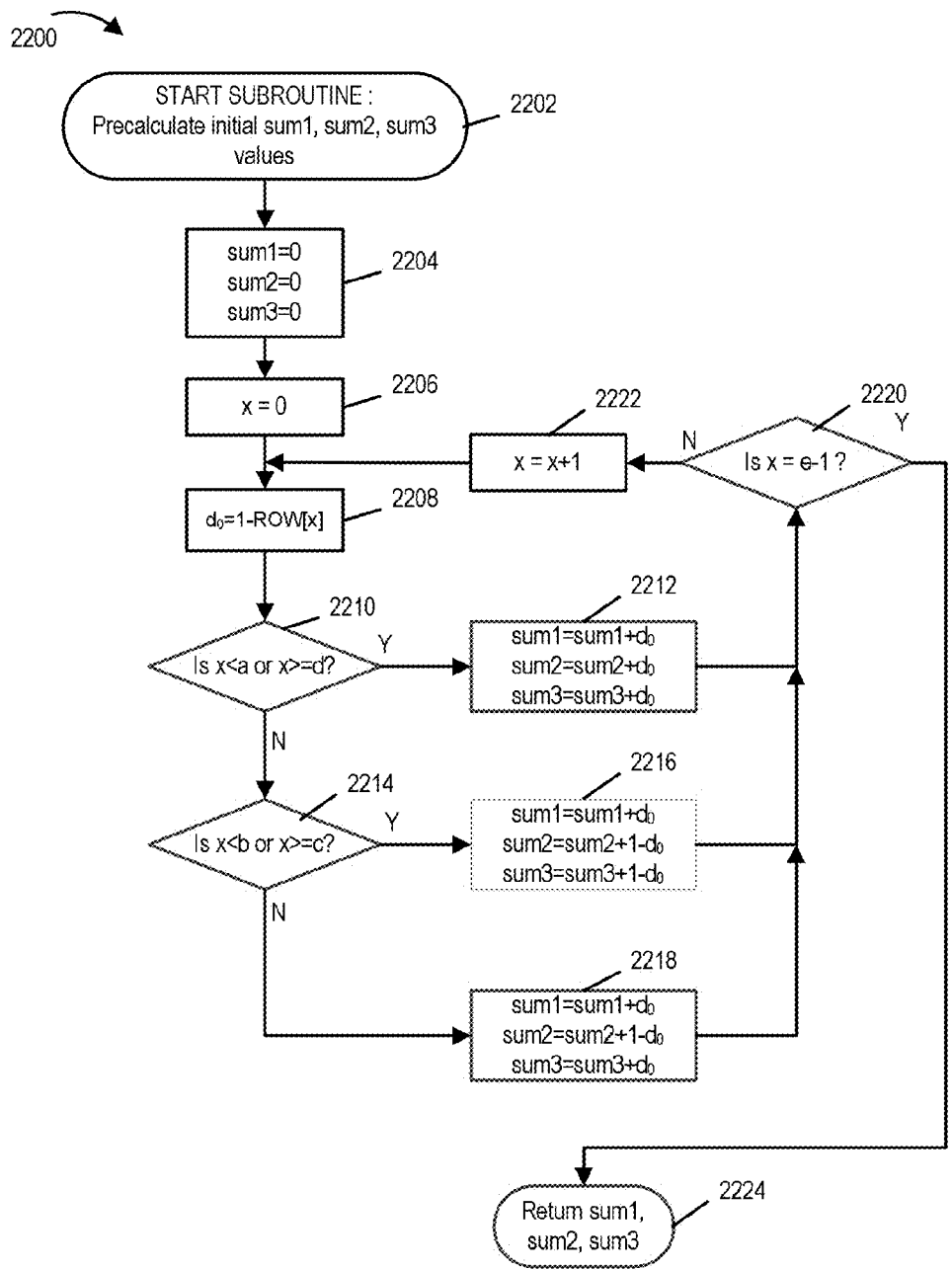
FIG. 22 is a flowchart of an exemplary method of calculating an initial set of sums for a row.

FIG. 22 is a flowchart 2200 of exemplary method of subroutine: Precalculate initial sum1, sum2, sum3 values, which may be implemented by implemented by a module within a device. In some embodiments, the module implementing the method of flowchart 2200 is the same module implementing the method of flowchart 1900 of FIG. 19. In some embodiments, the module implementing the method of flowchart 2200 is a sub-module of the module implementing the method of flowchart 1900 of FIG. 19. In some embodiments, the module implementing the method of flowchart 2200 is a sub-module of the module implementing the method of flowchart 2100 of FIG. 20. Operation of the exemplary method starts in step 2202. The array values ROW[ . . . ] obtained from step 2104 of flowchart 2100 are input values which are processed. Operation proceeds from start step 2202 to step 2204. In step 2204 the sum1, sum2 and sum3 are set to 0. Thus in step 2204 the following is performed: sum1=0; sum2=0; and sum3=0. Operation proceeds from step 2204 to step 2206. In step 2206, column counter x is set to 0. Thus in step 2206, the following is performed: x=0. Operation proceeds from step 2206 to step 2208. In step 2208 the temporary variable $d_0$ is set to 1—the value of the element with index x in array ROW. Thus in step 2208 the following operation is performed: $d_0$=1−ROW[x]. Operation proceeds from step 2208 to step 2210. In step 2210 the value of x is tested to determine if it is less than a or greater than or equal to d. If it is determined in step 2210 that either x is less than a or x is greater than or equal to d, then operation proceeds from step 2210 to step 2212. However, if it is determined in step 2210 that neither one of the conditions: (i) x<a and (ii) x>=d is true, then operation proceeds from step 2210 to step 2214.

In step 2214 the value of x is tested to determine if it is less than b or greater than or equal to c. If it is determined in step 2214 that either x is less than b or x is greater than or equal to c, then operation proceeds from step 2214 to step 2216. However, if it is determined in step 2214 that neither one of the conditions: (i) x<b and (ii) x>=c is true, then operation proceeds from step 2214 to step 2218.

In steps 2212, 2216, and 2218 the values are updated. In step 2212, the following operations are performed: sum1=sum1+$d_0$; sum2=sum2+$d_0$; sum3=sum3+$d_0$. Operation proceeds from steps 2212 to step 2220. In step 2216, the following operations are performed: sum1=sum1+$d_0$; sum2=sum2+1−$d_0$; sum3=sum3+1−$d_0$. Operation proceeds from steps 2216 to step 2220. In step 2218, the following operations are performed: sum1=sum1+$d_0$; sum2=sum2+1−$d_0$; sum3=sum3+$d_0$. Operation proceeds from steps 2218 to step 2220.

In step 2220 the value of x is tested to determine if it equals e−1. If in step 2220, it is determined that x is not equal to e−1, then additional processing needs to be performed, and operation proceeds from step 2220 to step 2222, in which the column counter x is incremented by 1. Operation proceeds from step 2222 to step 2208.

Returning to step 2220, if in step 2220, it is determined that x=e−1, then a set of image data corresponding to the width of the test pattern has been processed for the row of the image, which is the leftmost set of bitmap values of the image for the row, and the calculations are complete to determine the initial set of sum1, sum2 and sum 3 for the row of the image being processed, and operation proceeds from step 2220 to step 2224. In step 2224 the set of sum1, sum2 and sum 3 are returned to the subroutine calculate and store row sums in buffer.

The set of flowcharts of FIGS. 19, 20, 21 and 22 with be further explained in view of the example of FIGS. 6-18. The Bitmap of input 1903 corresponds to pixel values of the input image of FIG. 6, where a black pixel=1 and a white pixel=0; w is the width of the input image which is 14; h is the height of the input image which is 14. The input target parameters are the set of parameters {a, b, c, d, e} corresponding to target alignment pattern 430 of FIG. 4 with values of {2, 4, 6, 8, 10}, respectively.

In the approach used in the flowcharts of FIGS. 19, 20, 21, and 22, sets of {sum1, sum2, sum3} are calculated for each row moving down the image and the results stored in a Buffer. When enough rows have been processed to cover an area in which the target pattern may occupy within the image, a final sum of differences is calculated for the area. Each newly calculated final sum of differences is compared to determine if the value is smaller than a previous minimum. If the newly calculated minimum is smaller than it becomes the new minimum, minSum, and its coordinates, minPt, are stored. When, a row is no longer needed for processing it may be discarded.

Alternatively, each of the sets of sum values could have been determined and stored in the Buffer, and then the final sum of differences could have been calculated to determine a most likely location for the target pattern within the image.

Flowchart 2200 of FIG. 22 is used to generate the first column of FIG. 12. Each call to subroutine: Precalculate initial sum1, sum2, sum 3 values returns a set of {sum1, sum2, sum3} which is one of the entries of the first column of FIG. 12. Calculations performed by the flowchart 2200 of FIG. 22 are equivalent to the method described with respect to FIG. 8.

Flowchart 2100 of FIG. 21 is used to generate and store information for the Buffer, e.g., generate and store the sets of {sum1, sum2, sum3} of the Buffer of FIG. 12. Each call to subroutine: Calculate and Store Row Sums in Buffer results in filling one row of the Buffer of FIG. 12. The calculations of step 2114 are used to generate the sets of {sum1, sum2, sum3} of the second, third fourth and fifth columns of the Buffer of FIG. 12. Calculations of step 2114 correspond to the calculations of the examples of FIGS. 8-11.

Flowchart 2000 of FIG. 20 is used to calculate the sums (1303, 1305, 1307, 1309, 1311, 1403, 1405, 1407, 1409, 1411, 1503, 1505, 1507, 1509, 1511, 1603, 1607, 1609, 1611, 1703, 1705, 1707, 1709, 1711) of FIGS. 13, 14, 15, 16, and 17 which are tabulated in FIG. 18 and to identify which one is the smallest and to identify the coordinates of the smallest. In this example, minSum=0, and the coordinates MinPt=(2,2), which represents offsets of a most likely location of the target from the top most corner of the image.

Figures 23, 23A:
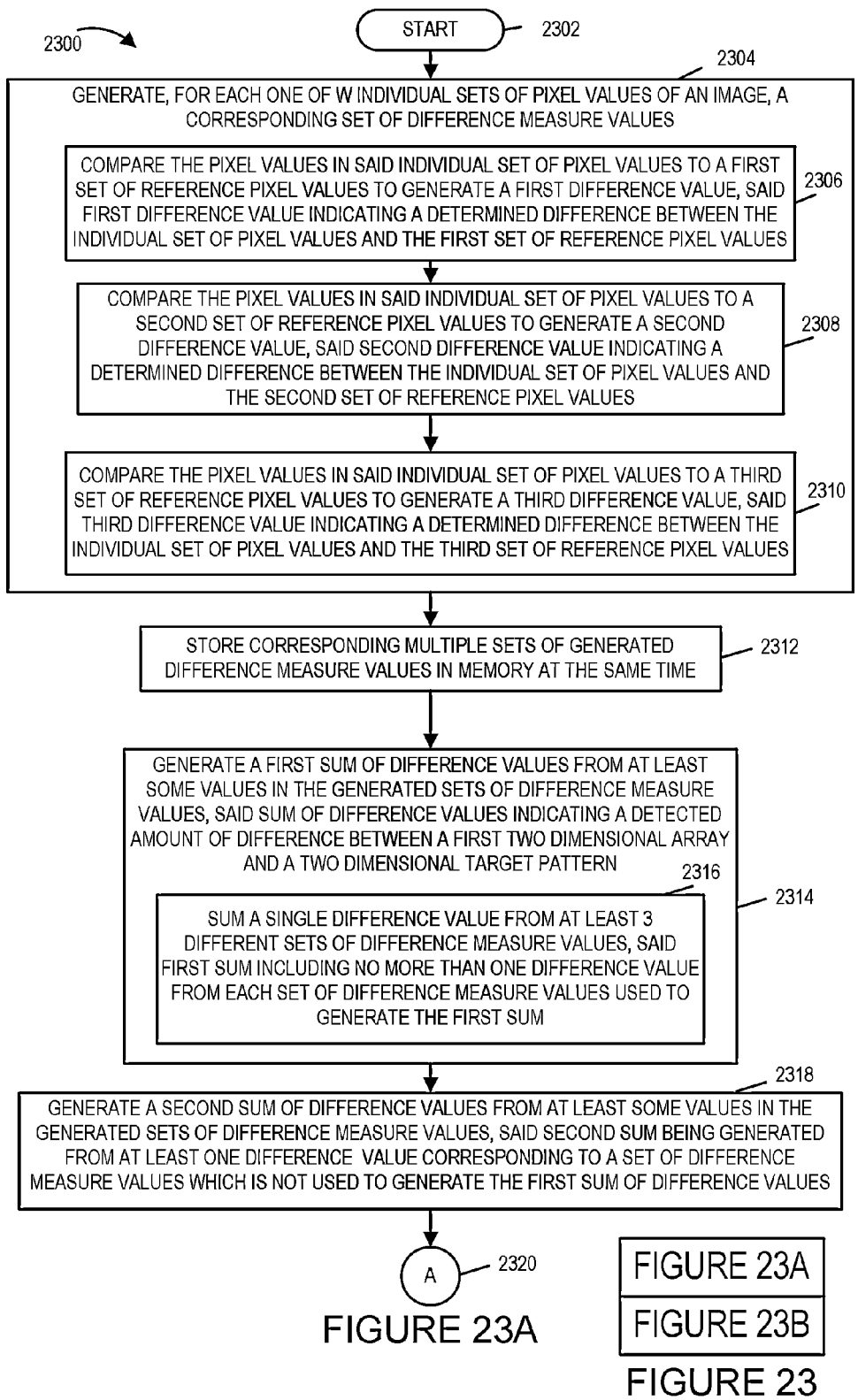
FIG. 23, comprising the combination of FIG. 23A and FIG. 23B, is a flowchart of an exemplary method of operating a module a device to identify the location of one or more target image patterns in an image.
Figure 23B:
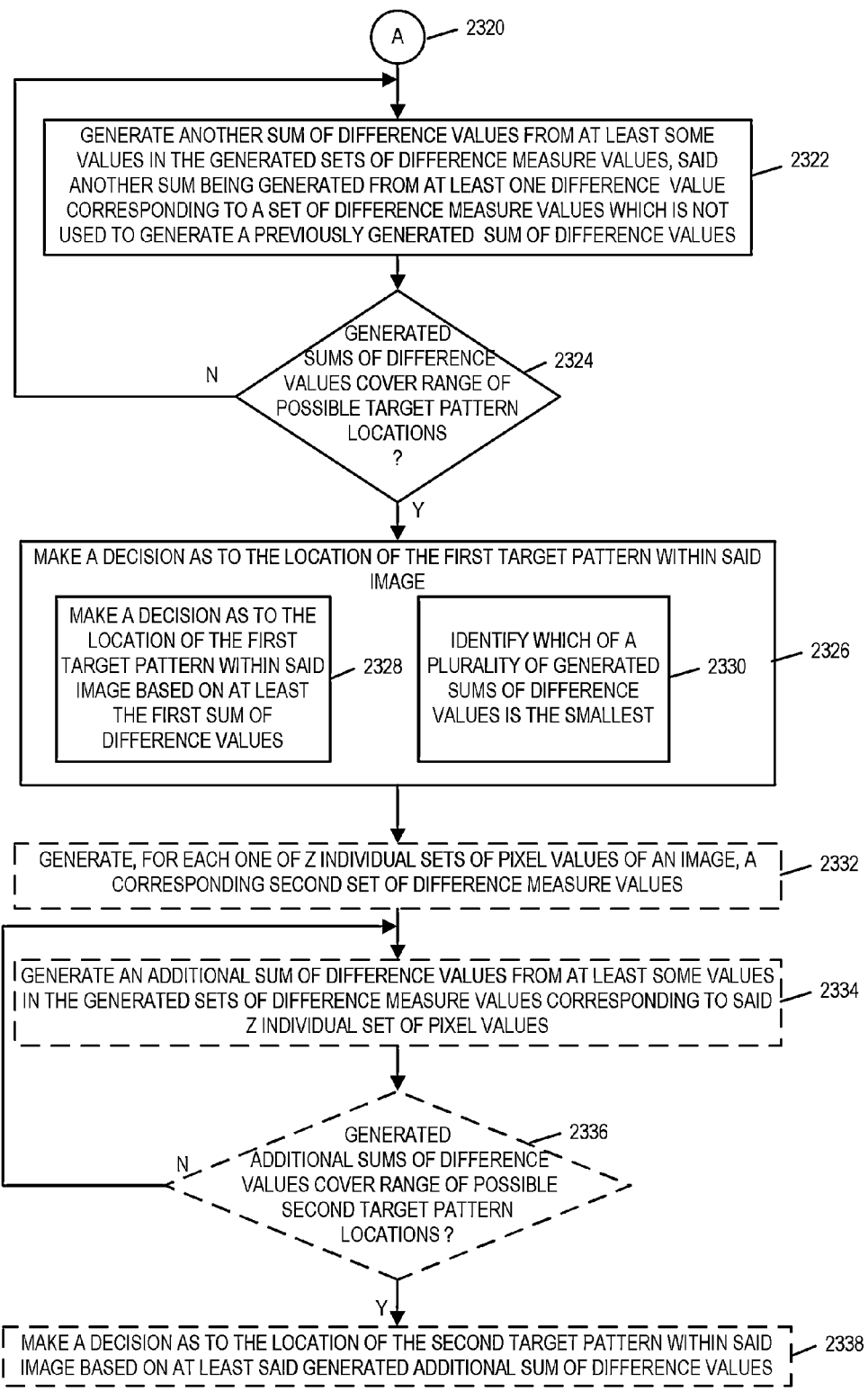

FIG. 23, comprising the combination of FIG. 23A and FIG. 23B, is a flowchart 2300 of an exemplary method of operating a module, e.g., a pattern location determination module, within a device, e.g., a desktop computer or handheld mobile battery powered device, to identify the location of one or more target image patterns in an image. The exemplary method of flowchart 2300 identifies the location of a first target image pattern, and in some embodiments, a second target image pattern in the image. In some embodiments, the first target image pattern is one of a QR code finder pattern and a QR code alignment pattern. In some such embodiments, the first target image pattern is a QR code finder pattern and the second target image pattern is a QR code alignment pattern. The exemplary method starts in step 2302 where the module is initialized. Operation proceeds from step 2302 to step 2304.

In step 2304 the module generates, for each one of W individual sets of pixel values of an image, a corresponding set of difference measure values. The corresponding set of difference measure values includes at least one of a first difference measure value, a second difference measure value, or a third difference measure value. The first difference measure value indicates a measure of the difference between pixel values in said individual set of pixel values and a first reference set of pixel values. The second difference measure value indicates a measure of the difference between pixel values in said individual set of pixel values and a second reference set of pixel values. The third difference measure value indicates a measure of the difference between pixel values in said individual set of pixel values and a third reference set of pixel values. The W sets of pixel values including pixel values from at least two consecutive rows or columns of the image. In some embodiments, each of the individual sets of pixel values in said W individual sets of pixel values corresponds to a single row or column. Step 2304 includes steps 2306, 2308 and 2310.

In step 2306, the module compares the pixel values in said individual set of pixel values to a first set of reference pixel values to generate a first difference value, said first difference value indicating a determined difference between the individual set of pixel values and the first set of reference values. In some embodiments, the first set of reference pixel values corresponds to a pattern of pixels expected to appear in a first row of the first target image pattern. In some such embodiments, the first pattern is a pattern of all black pixels. Operation proceeds from step 2306 to step 2308. In step 2308, the module compares the pixel values in said individual set of pixel values to a second set of reference values to generate a second difference value, said second difference value indicating a determined difference between the individual set of pixel values and the second set of reference values. In some embodiments, the second set of reference pixel values corresponds to a second pattern of pixels expected to appear in an intermediate row of a target image. In some such embodiments, the second set of reference pixel values corresponds to a pattern of black pixels, then white pixels, then black pixels. Operation proceeds from step 2308 to step 2310. In step 2310 the module compares the pixel values in said individual set of pixel values to a third set of reference pixel values to generate a third difference value, said third difference value indicating a determined difference between the individual set of pixel values and the third set of reference pixel values. In some embodiments, the third set of reference pixel values corresponds to a third pattern of pixels expected to appear in a center row of the first target image pattern. In some such embodiments, the third set of reference pixel values corresponds to a pattern of black pixels, then white pixels, then black pixels, then white pixels, and then black pixels.

Operation proceeds from step 2304 to step 2312. In step 2312, the module stores corresponding multiple sets of generated difference measure values in a memory at the same time. Operation proceeds from step 2312 to step 2314.

In step 2314 the module generates a first sum of difference values from at least some values in the generated set of difference measure values, said sum of difference values indicating a detected amount of difference between a first two dimensional array and a two dimensional target pattern. Step 2314 includes step 2316 in which the module sums a single difference value from at least 3 different sets of difference measure values, said first sum including no more than one difference value from each set of difference measure values used to generate the first sum. In some embodiments, generating a first sum of difference values includes summing at least one difference measure value corresponding to each of the first second and third reference patterns. In some embodiments, generating a first sum of difference values includes summing twice as many first and second difference measure values as third difference measure values. In some embodiments, generating the first sum of difference values includes accessing a first plurality of stored sets of generated difference measure values to retrieve there from difference values used in generating said first sum of difference values. Operation proceeds from step 2314 to step 2318.

In step 2318 the module generates a second sum of difference values from at least some values in the generated sets of difference measure values, said second sum being generated from at least one difference value corresponding to a set of difference measure values which is not used to generate the first sum of difference values. In some embodiments, generating a second sum of difference values from at least some values used in the generated sets of difference measure values includes accessing a second plurality of stored sets of difference values using in generating said first sum of difference values. In some such embodiments, the second accessed plurality of stored sets of difference values is a function of a pixel location in said image to which the second sum of difference values corresponds. In some such embodiments, the second sum is generated from at least one difference value corresponding to a set of difference measure values which is not used to generate the first sum of difference values. Operation proceeds from step 2318 via connecting node A 2320 to step 2322.

In step 2322 the module generates another sum of difference values from at least sum values in the generated sets of difference measure values, said another sum being generated from at least one difference value corresponding to a set of difference measure values which is not used to generate a previously generated sum of difference values. Operation proceeds from step 2322 to step 2324. In step 2324 the module checks to determine if the generated sums of difference values covers the range of possible target pattern locations. If the module determines in step 2324 that the generated sums of difference values does not yet cover the range of possible target pattern locations, then operation proceeds from step 2324 to step 2322 to generate yet another sum of difference values. However, if the module determines in step 2324 that the generated sums of difference values covers the range of possible target pattern locations, then operation proceeds from step 2324 to step 2326.

In step 2326 the module makes a decision as to the location of the first target pattern within the image. Step 2326 includes steps 2328 and 2330, where in some embodiments, are performed jointly. In step 2328 the module makes a decision as to the location of the first target pattern within the image based on at least the first sum of difference values. In some embodiments, the module makes the decision as to the location of the first target pattern within said image based on at least the first sum of difference values and the second sum of difference values. In step 2330 the module identifies which of a plurality of generated sums of difference values is the smallest. In some embodiments, the location of the target pattern is decided to be the center point of the generated sum of difference values which is determined to be the smallest.

In some embodiments, operation proceeds from step 2326 to step 2332. In step 2332 the module generates for each one of Z individual sets of pixel values of an image, a corresponding second set of difference measure values. The corresponding second set of difference measure values includes at least one of a fourth difference measure value, a fifth difference measure value, or a sixth difference measure value. The fourth difference measure value indicates a measure of the difference between pixel values in said individual one of Z sets of pixel values and a fourth reference set of pixel values. The fifth difference measure value indicates a measure of the difference between pixel values in said individual one of Z sets of pixel values and a fifth reference set of pixel values. The sixth difference measure value indicates a measure of the difference between pixel values in said individual one of Z sets of pixel values set and a sixth reference set of pixel values. The Z sets of pixel values includes pixel values from at least two consecutive rows or columns of the image, each individual one of said Z sets of pixel values corresponding to a single row or column of pixel values.

In some embodiments, the first target image pattern is a QR code finder pattern, and second target image pattern is QR code alignment pattern. In some such embodiments, the fourth, fifth and sixth reference pixel patterns including fewer pixels than said first, second and third reference pixel patterns. In various embodiments, the first and fourth reference pixel patterns are solid black pixel patterns, the second and fifth reference pixel patterns are black-white-black pixel patterns; and the third and sixth pixel patterns are black-white-black-white-black pixel patterns. Operation proceeds from step 2332 to step 2334.

In step 2334 the module generates an additional sum of difference values from at least some values in the generated set of difference measure values corresponding to said Z individual sets of pixel values. The generated additional sum of difference values indicates a detected amount of difference between a second two dimensional array of pixel values and a second two dimensional target pattern. Operation proceeds from step 2334 to step 2336. In step 2336 the module checks to determine if the generated additional sums of difference values cover the range of possible second target pattern locations. If the module determines in step 2336 that the generated additional sums of difference values does not yet cover the range of possible second target pattern locations, then operation proceeds from step 2336 to step 2334 to generate yet another additional sum of difference values. However, if the module determines in step 2336 that the generated additional sums of difference values covers the range of possible second target pattern locations, then operation proceeds from step 2336 to step 2338.

In step 2338 the module makes a decision as to the location of the second target pattern within said image based on at least said generated additional sum of difference values.

In some embodiments, the first target image pattern is a QR code finder pattern, and second target image pattern is QR code alignment pattern. In some such embodiments, the fourth, fifth and sixth reference pixel patterns including fewer pixels than said first, second and third reference pixel patterns. In various embodiments, the first and fourth reference pixel patterns are solid black pixel patterns, the second and fifth reference pixel patterns are black-white-black pixel patterns; and the third and sixth pixel patterns are black-white-black-white-black pixel patterns.

In one example, the target pattern being searched for is the QR alignment pattern 430 of FIG. 4, and the input image being searched is exemplary image 600 of FIG. 6. The first set of reference pixel values is reference pixel set 514 of FIG. 5; the second set of reference pixel values is reference pixel set 516 of FIG. 5; and the third set of reference pixel values is reference pixel set 518 of FIG. 5. A corresponding set of difference measure values is a set of {sum1, sum2, sum3} In this example, 70 sets of difference measure values are generated in step 2304. The storing of the multiple sets of generated difference measure values in a memory of step 2312 is, e.g., in a buffer such as buffer 1200 of FIG. 12. Generating a first sum of difference values of step 2314 corresponds, e.g., to generating the sum 1308 of FIG. 13. Note that the sum 1303 includes a single difference value from 10 different sets of different measure values, with one difference value from each of the 10 different set difference measure values. Generating a second sum of difference values of step 2318 correspond, e.g., to generating sum 1305. Step 2322 is, e.g., executed 23 times resulting in sums (1307, 1309, 1311, 1403, 1405, 1407, 1409, 1411, 1503, 1505, 1507, 1511, 1603, 1605, 1607, 1609, 1611, 1703, 17705, 1707, 1709, 1711) of FIGS. 13, 14, 15, 16 and 17.

Making a decision as to the location of the first target pattern within said image of step 2326 corresponding to finding the location of the sum of difference value within final sums matrix 1800 of FIG. 8. In this example, the smallest sum of differences value in the matrix 1800 is 0 which is the value of sum 1507 which has coordinates of (2,2). The coordinates indicate an offset of the QR alignment target pattern 430 from the leftmost corner of the image 600.

In another example, in which the method of flowchart 2300 searches for both a QR code finder pattern and an a QF code alignment pattern, the first target pattern is QR code finder pattern 410 of FIG. 4 and the second target pattern is QR code alignment pattern 430 of FIG. 4. In this example, the first set of reference pixel values is reference pixel set 508 of FIG. 5; the second set of reference pixel values is reference pixel set 510 of FIG. 5; and the fourth set of reference pixel values is reference pixel set 514 of FIG. 5; the fifth set of reference pixel values is reference pixel set 516 of FIG. 5; the sixth set of reference pixel values is reference pixel set 518 of FIG. 5.

Figure 24:
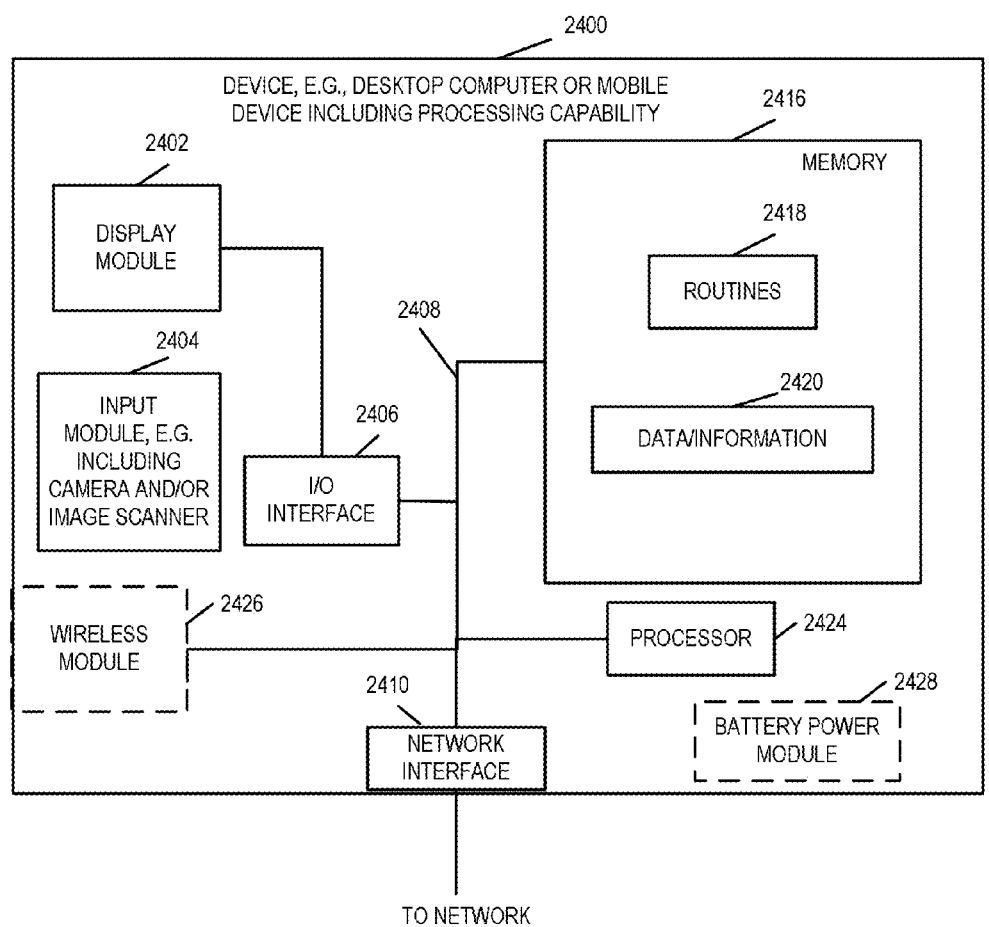
FIG. 24 illustrates an exemplary device implemented in accordance with an exemplary embodiment.

FIG. 24 illustrates an exemplary device 2400, e.g., a desktop personal computer or a mobile device including processing capability, for processing image data implemented in accordance with an exemplary embodiment. The exemplary device 2400 includes a display module 2402, input module 2404, memory 2416, processor 2424, I/O interface 2406, and network interface 2410. In some embodiments, device 2400 also includes a wireless module 2426 for supporting wireless communications and a battery power module 2428 for operating the device 2400 on battery power.

Input module 2404 includes, e.g. a scanner, camera, keyboard, keypad, touch screen, mouse, and/or other user input devices. The display and input modules are coupled to a bus 2408 by I/O interface 2406. The bus 2408 is also coupled to the memory 2416, processor 2424 and network interface 2410. The network interface 2410 couples the internal components of the device 2400 to an external network, e.g., the Internet, thereby allowing the device 2400 to receive and send data over a network. Alternatively, or in addition, wireless module 2426 which includes a wireless transmitter and a wireless receiver, couples device 2400 to other wireless devices and/or a wireless communications network.

Memory 2416 includes routines 2418 and data/information 2420. Processor 2424 controls operation of the device 2400 under the directions of modules, e.g., software modules, and/or routines stored in memory 2416.

In various embodiments, processor 2424 is configured to implement the method of flowchart 2300 of FIG. 23. In some embodiments, processor 2424 is configured to generate, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image; and generate a first sum of difference values from at least some values in the generated sets of difference measure values, said sum of difference values indicating a detected amount of difference between a first two dimensional array of pixel values and a two dimensional target pattern. In some embodiments, processor 2424 is further configured to make a decision as to the location of the first target pattern within said image based on at least said first sum of difference values.

In some embodiments, each of the individual set of pixel values in said W individual sets of pixel values corresponds to a single row or column. In some such embodiments, processor 2424 is further configured to compare the pixel values in said individual set of pixel values to a first set of reference pixel values to generate a first difference value, said first difference value indicating a determined difference between the individual set of pixel values and the first set of reference pixel values, as part of being configured to generate, a corresponding set of difference measure values for one of said W individual sets of pixel values of an image. In some such embodiments, processor 2424 is further configured to compare the pixel values in said individual set of pixel values to a second set of reference pixel values to generate a second difference value, said second difference value indicating a determined difference between the individual set of pixel values and the second set of reference pixel values, as part of being configured to generate, a corresponding set of difference measure values for one of said W individual sets of pixel values of an image. In some such embodiments, processor 2424 is further configured to compare the pixel values in said individual set of pixel values to a third set of reference pixel values to generate a third difference value, said third difference value indicating a determined difference between the individual set of pixel values and the third set of reference pixel values, as part of being configured to generate, a corresponding set of difference measure values for one of said W individual sets of pixel values of an image.

In some embodiments, the first set of reference pixel values corresponds to a first pattern of pixels expected to appear in a first row of the first target image pattern. In some such embodiments, the first pattern is a pattern of all black pixels. In some embodiments, the second set of reference pixel values corresponds to a second pattern of pixels expected to appear in an intermediate row of the first target image.

In some such embodiments, the second set of reference pixel values corresponds to a pattern of black pixels, then white pixels, then black pixels. In some embodiments, the third set of reference pixel values corresponds to a third pattern of pixels expected to appear in a center row of the first target image pattern. In some such embodiments, the third set of reference pixel values corresponds to a pattern of black pixels, then white pixels, then black pixels, then white pixels, then black pixels.

In various embodiments, processor 2424 is further configured to: sum a single difference value from at least 3 different sets of difference measure values, said first sum including no more than one difference value from each set of difference measure values used to generate said first sum, as part of being configured to generate a first sum of difference values from at least some values in the generated sets of difference measure values.

In some embodiments, processor 2424 is configured includes summing at least one difference measure value corresponding to each of said first, second and third reference patterns, as part of being configured to generate a first sum of difference values. In various embodiments, processor 2424 is configured to sum twice as many first and second difference measure values as third difference measure values, as part of being configured to generate a first sum of difference values.

In some embodiments, processor 2424 is further configured to store corresponding multiple sets of generated difference measure values in memory at the same time. In some such embodiments, processor 2424 is configured to access a first plurality of stored sets of generated difference measure values to retrieve there from difference values used in generating said first sum of difference values, as part of being configured to generate said first sum of difference values.

In some embodiments, processor 2424 is configured to generate a second sum of difference values from at least some values in the stored sets of difference measure values, said second sum being generated from at least one difference value corresponding to a set of difference measure values which is not used to generate said first sum of difference values. In some such embodiments, processor 2424 is configured to access a second plurality of stored sets of difference values used in generating said first sum of difference values as part of being configured to generate a second sum of difference values from at least some values in the generated sets of difference measure values. In some such embodiments, the second accessed plurality of stored sets of difference values is a function of a pixel location in said image to which the second sum of difference values corresponds.

In some embodiments, processor 2424 is configured to generate said second sum from at least one difference value corresponding to a set of difference measure values which is not used to generate said first sum of difference values.

In various embodiments, processor 2424 is configured to make a decision as to the location of the first target pattern within said image is based on at least both said first sum of difference values and said second sum of difference values. In some embodiments, processor 2424 is configured to identify which of a plurality of generated sums of difference values is smallest, as part of being configured to make a decision as to the location of the first target pattern.

In various embodiments, first target image pattern is one of a QR code finder pattern and a QR code alignment pattern.

In some embodiments, the first target image pattern is a QR code finder pattern, and processor 2424 is also configured to identify a location of a second target image pattern in said image. In some such embodiments, processor 2424 is further configured to generate, for each one of Z individual sets of pixel values of an image, a corresponding second set of difference measure values, said corresponding second set of difference measure values including at least one of a fourth difference measure value, a fifth difference measure value, or a sixth difference measure value, said fourth difference measure value indicating a measure of the difference between pixel values in said individual one of Z sets of pixel values and a fourth reference set of pixel values, said fifth difference measure value indicating a measure of the difference between pixel values in said individual one of Z sets of pixel values and a fifth reference set of pixel values, said sixth difference measure value indicating a measure of the difference between pixel values in said individual one of Z sets of pixel values set and a sixth reference set of pixel values, said Z sets of pixel values including pixel values from at least two consecutive rows or columns of the image, each individual one of said Z sets of pixel values corresponding to a single row or column of pixel values; and generate an additional sum of difference values from at least some values in the generated sets of difference measure values corresponding to said Z individual sets of pixel values, said additional sum of difference values indicating a detected amount of difference between a second two dimensional array of pixel values and a second two dimensional target pattern; and make a decision as to the location of the second target pattern within said image based on at least said generated additional sum of difference values.

In some such embodiments, said second target image pattern is QR code alignment pattern, said fourth, fifth and sixth reference pixel patterns including fewer pixels than said first, second and third reference pixel patterns. In some such embodiments, said first and fourth reference pixel patterns are solid black pixel patterns, the second and fifth reference pixel patterns are black-white-black pixel patterns; and the third and sixth reference pixel patterns are black-white-black-white-black pixel patterns.

Figures 25, 25A:
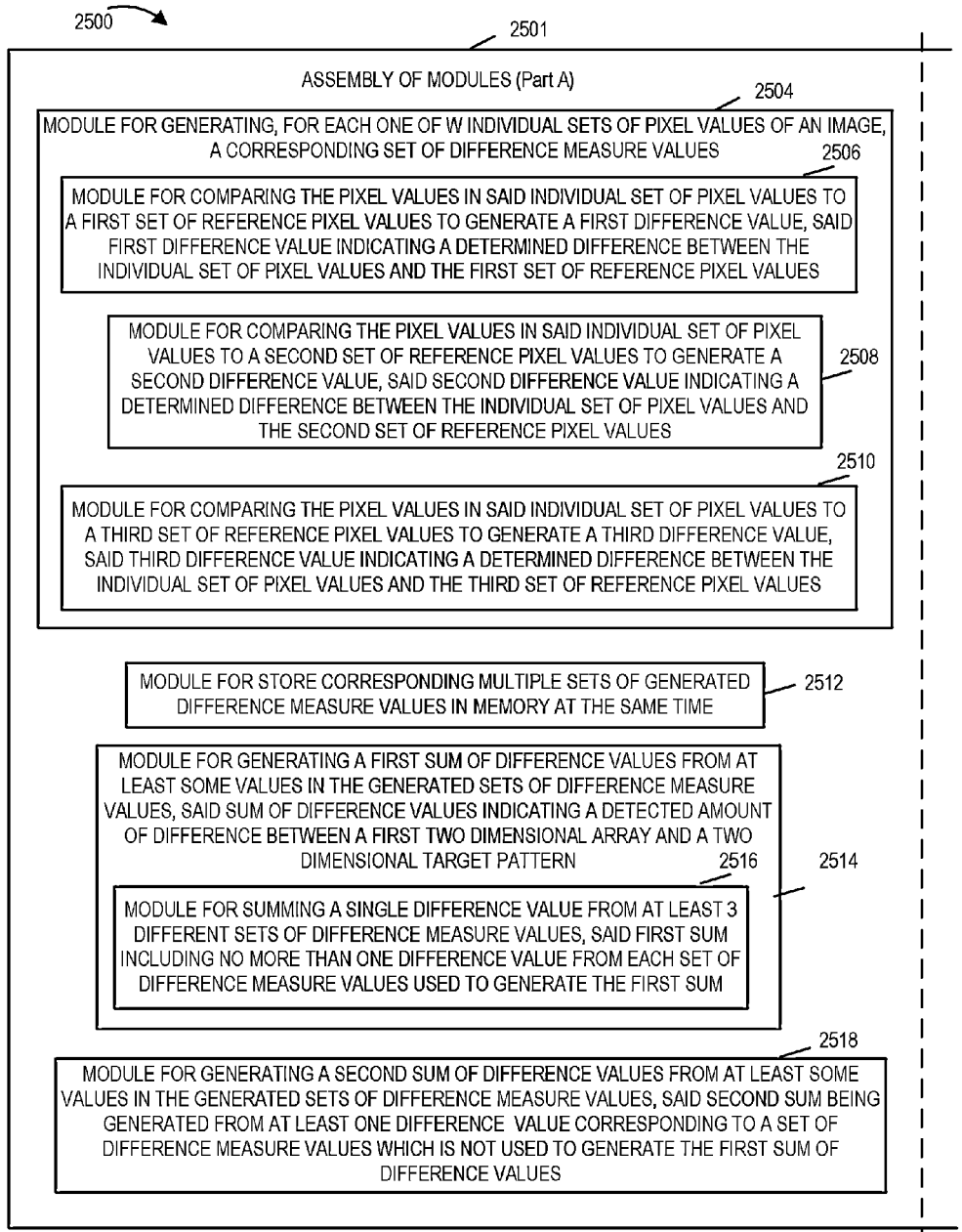
FIG. 25 is an assembly of modules which can, and in some embodiments is, used in the exemplary device illustrated in FIG. 24.
Figure 23B:
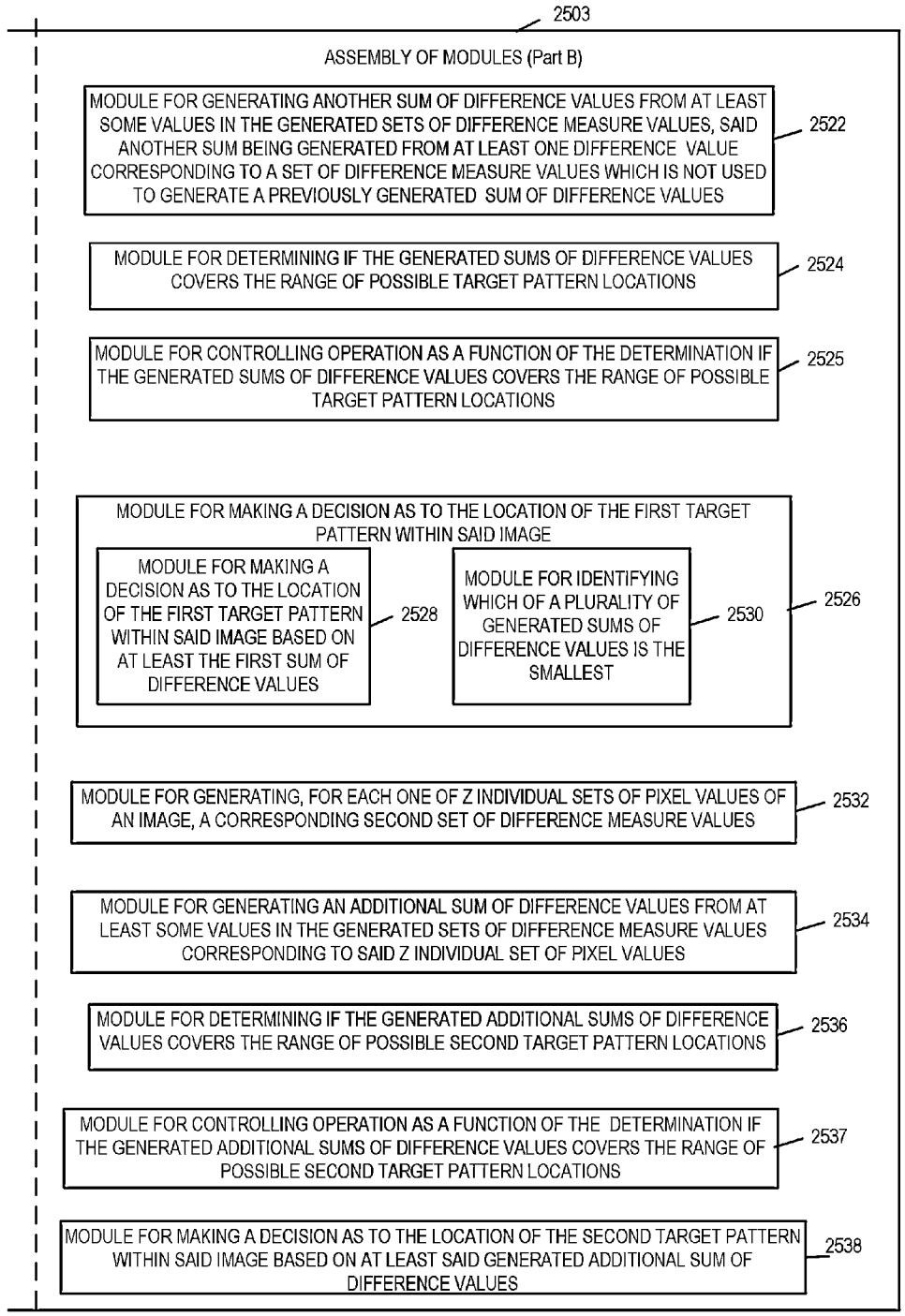

FIG. 25 is an assembly of modules 2500 which can, and in some embodiments is, used in the exemplary device 2400 illustrated in FIG. 24. The modules in the assembly 2500 can be implemented in hardware within the processor 2424 of FIG. 24, e.g., as individual circuits. Alternatively, the modules may be implemented in software and stored in the memory 2416 of device 2400 shown in FIG. 24. In some such embodiments, the assembly of modules 2500 is included in routines 2418 of memory 2416 of device 2400 of FIG. 24. While shown in the FIG. 24 embodiment as a single processor, e.g., computer, it should be appreciated that the processor 2424 may be implemented as one or more processors, e.g., computers. When implemented in software the modules include code, which when executed by the processor, configure the processor, e.g., computer, 2424 to implement the function corresponding to the module. In some embodiments, processor 2424 is configured to implement each of the modules of the assembly of modules 2500. In embodiments where the assembly of modules 2500 is stored in the memory 2416, the memory 2416 is a computer program product comprising a computer readable medium, e.g., a non-transitory computer readable medium, comprising code, e.g., individual code for each module, for causing at least one computer, e.g., processor 2424, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 25 control and/or configure the device 2400 or elements therein such as the processor 2424, to perform the functions of the corresponding steps illustrated and/or described in the method of flowchart 2300 of FIG. 23.

FIG. 25, comprising the combination FIG. 25A and FIG. 25B is an assembly of modules 2500 which includes part A 2501 and part B 2503. In some embodiments, assembly of modules 2500 is a single module and modules within assembly of modules 2500 are sub-modules. Assembly of modules 2500 is, e.g., included in device 2400. In some embodiments, assembly of modules 2400 is included in routines 2418 of memory 2416. Assembly of modules 2500 includes a module 2504 for generating, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image. Assembly of modules 2500 further includes a module 2512 for storing corresponding multiple sets of generated difference measure values in memory at the same time, a module 2514 for generating a first sum of difference values from at least some values in the generated set of difference measure values, said sum of difference values indicated a detected amount of difference between a first two dimensional array and a two dimensional target pattern, and a module 2518 for generating a second sum of difference measure values from at least some values in the generated sets of difference measure values, said second sum being generated from at least one difference value which is not used to generate the first sum of difference values. Assembly of modules 2500 further includes a module 2522 for generating another sum of difference values from at least some values in the generated sets of difference measure values, said another sum being generated from at least difference value corresponding to a set of difference measure values which is not used to generate a previously generated sum of difference values, a module 2524 for determining if the generated sums of difference values covers the range of possible target pattern locations, a module 2525 for controlling operation as a function of the determination if the generated sums of difference values covers the range of possible target pattern locations, and a module 2526 for making a decision as to the location of the first target pattern within said image.

Module 2504 includes a module 2506 for comparing the pixel values in said individual set of pixel values to a first set of reference pixel values to generate a first difference value, said first difference value indicating a determined difference between the individual set of pixel values and the first set of reference values, a module 2508 for comparing the pixel values in said individual set of pixel values to a second set of reference pixel values to generate a second difference value, said second difference value indicating a determined difference between the individual set of pixel values and the second set of reference values, and a module 2510 for comparing the pixel values in said individual set of pixel values to a third set of reference pixel values to generate a third difference value, said third difference value indicating a determined difference between the individual set of pixel values and the third set of reference values. Module 2514 includes a module 2516 for summing a single difference value from at least 3 different sets of difference measure values, said first sum including no more than one difference value from each set of difference measure values used to generate the first sum. Module 2526 includes a module 2528 for making a decision as to the location of the first target pattern within said image based on at least the first sum of difference values 2528 and a module 2530 for identifying which of a plurality of generated sums of difference values is the smallest.

Assembly of modules 2500 further includes a module 2532 for generating, for each one of Z individual sets of pixel values of an image, a corresponding second set of difference measure values, said corresponding second set of difference measure values including at least one of a fourth difference measure value, a fifth difference measure value, or a sixth difference measure value, said fourth difference measure value indicating a measure of the difference between pixel values in said individual one of Z sets of pixel values and a fourth reference set of pixel values, said fifth difference measure value indicating a measure of the difference between pixel values in said individual one of Z sets of pixel values and a fifth reference set of pixel values, said sixth difference measure value indicating a measure of the difference between pixel values in said individual one of Z sets of pixel values set and a sixth reference set of pixel values, said Z sets of pixel values including pixel values from at least two consecutive rows or columns of the image, each individual one of said Z sets of pixel values corresponding to a single row or column of pixel values. Assembly of modules 2500 further includes a module 2534 for generating an additional sum of difference values from at least some values in the generated sets of difference measure values corresponding to said Z individual sets of pixel values, a module 2536 for determining if the generated additional sums of difference values covers the range of possible second target pattern locations, a module 2537 for controlling operation as a function of the determination if the generated additional sums of difference values covers the range of possible target pattern locations and a module 2538 for making a decision as to the location of the second target pattern within said image based on at least said generated additional sum of difference values.

In some embodiments, each individual set of pixel values in said W individual set of pixel values corresponds to a single row or column. In some embodiments, the first set of reference pixel values corresponds to a first pattern of pixels expected to appear in a first row of the first target image pattern. In some such embodiments, the first pattern is a pattern of all black pixels. In some embodiments, the second set of reference pixel values corresponds to a second pattern of pixels expected to appear in an intermediate row of the first target image. In some embodiments, the second set of reference pixel values corresponds to a pattern of black pixels, then white pixels, and then black pixels. In some embodiments, the third set of reference pixel values corresponds to a third pattern of pixel expected to appear in the center row of the first target image pattern.

In some embodiments, module 2514 sums at least one difference measure value correspond to each of the first, second, and third reference patterns. In some embodiments, module 2514 sums twice as many first and second difference measure values as third difference measure values. In some embodiments, module 2514 accesses a first plurality of stored sets of generated difference measure values to retrieve there from difference values used in generating said first sum of difference values. In various embodiments, module 2518 accesses a second plurality of stored sets of difference values used in generating said first sum of difference values. In some such embodiments, the second accessed plurality of stored sets of difference values is a function of a pixel location in the image to which the second sum of difference values corresponds. In some embodiments, module 2518 generates the second sum from at least one difference value corresponding to a set of difference measure values which is not used to generate the first sum of difference values.

In some embodiments, module 2526 makes a decision as to the location of the first target pattern within said image based on at least the first sum of the difference values and the second sum of difference values.

In some embodiments, the first target pattern is a one of a QR code finder pattern and the QR code alignment pattern. In one example embodiment, the first target pattern is a QR code finder pattern and the second target pattern is a QR code alignment pattern. In some such embodiments, said fourth, fifth and sixth reference pixel patterns including fewer pixels than said first, second and third reference pixel patterns. In some such embodiments, the first and fourth reference pixel patterns are solid black pixel patterns, the second and fifth reference pixel patterns are black-white-black pixel patterns, and the third and sixth reference pixel patterns are black-white-black-white-black pixel patterns.

Figure 26:
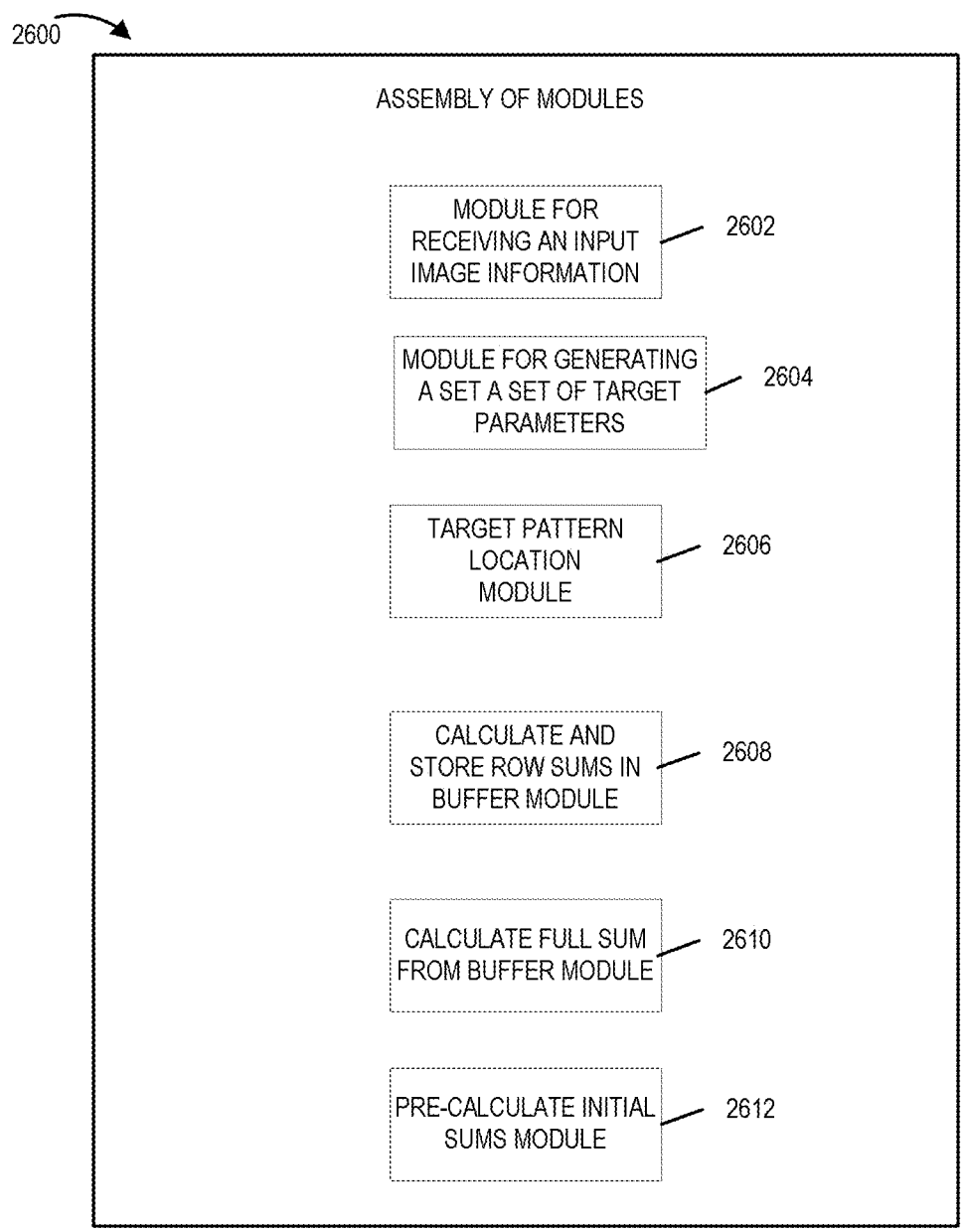
FIG. 26 is an assembly of module which can, and in some embodiments is, used in the exemplary device illustrated in FIG. 24.

FIG. 26 is an assembly of modules 2600 which can, and in some embodiments is, used in the exemplary device 2400 illustrated in FIG. 24. The modules in the assembly 2600 can be implemented in hardware within the processor 2424 of FIG. 24, e.g., as individual circuits. Alternatively, the modules may be implemented in software and stored in the memory 2416 of device 2400 shown in FIG. 24. In some such embodiments, the assembly of modules 2600 is included in routines 2418 of memory 2416 of device 2400 of FIG. 24. While shown in the FIG. 24 embodiment as a single processor, e.g., computer, it should be appreciated that the processor 2424 may be implemented as one or more processors, e.g., computers. When implemented in software the modules include code, which when executed by the processor, configure the processor, e.g., computer, 2424 to implement the function corresponding to the module. In some embodiments, processor 2424 is configured to implement each of the modules of the assembly of modules 2600. In embodiments where the assembly of modules 2600 is stored in the memory 2416, the memory 2416 is a computer program product comprising a computer readable medium, e.g., a non-transitory computer readable medium, comprising code, e.g., individual code for each module, for causing at least one computer, e.g., processor 2424, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 26 control and/or configure the device 2400 or elements therein such as the processor 2424, to perform the functions of the corresponding steps illustrated and/or described in the method of flowcharts 1900, 2000, 2100 and 2200 of FIGS. 19, 20, 21 and 22.

FIG. 26 is a drawing of an assembly of modules 2600, which may be included in device 2400. In some embodiments assembly of modules 2600 is included in routines 2418. In some embodiments, assembly of modules 2600 is a single module and modules within assembly of modules 2600 are sub-modules. Assembly of modules 2600 includes a module 2602 for receiving input image information, a module 2604 for generating a set of target parameters, a target pattern location module 2606, a calculate and store row sums in buffer module 2608, a calculate full sum from buffer module 2610, and a pre-calculate initial sums module 2612. Module 2602 receives input image information including values corresponding to each pixel of the input image, height information and width information of the input image being processed. Module 2604 generates a set of parameters, e.g. a set of {a, b, c, d, e} boundary parameters corresponding to the target image which is to be searched for based on the module size and type of target, e.g., QR code finder pattern or QR code alignment pattern. Target pattern location module 2606 finds a likely location of a QR code finder pattern and/or a QR code alignment pattern within an input image. Target pattern location module 2606, in some embodiments, implements the method of flowchart 1900 of FIG. 19. Calculate and store row sums in buffer module 2610, in some embodiments, implements the method of flowchart 2100 of FIG. 21. Calculate full sum from buffer module 2610, in some embodiments, implements the method of flowchart 2000 of FIG. 20. Pre-calculate initial sums module 2612, in some embodiments, implements the method of flowchart 2200 of FIG. 22. In various embodiments, within module 2606 there is an individual module corresponding to each step of flowchart 1900, which when executed performs the step. In various embodiments, within module 2608 there is an individual module corresponding to each step of flowchart 2100, which when executed performs the step. In various embodiments, within module 2608 there is an individual module corresponding to each step of flowchart 2000, which when executed performs the step. In various embodiments, within module 2612 there is an individual module corresponding to each step of flowchart 2200, which when executed performs the step.

Figure 27:
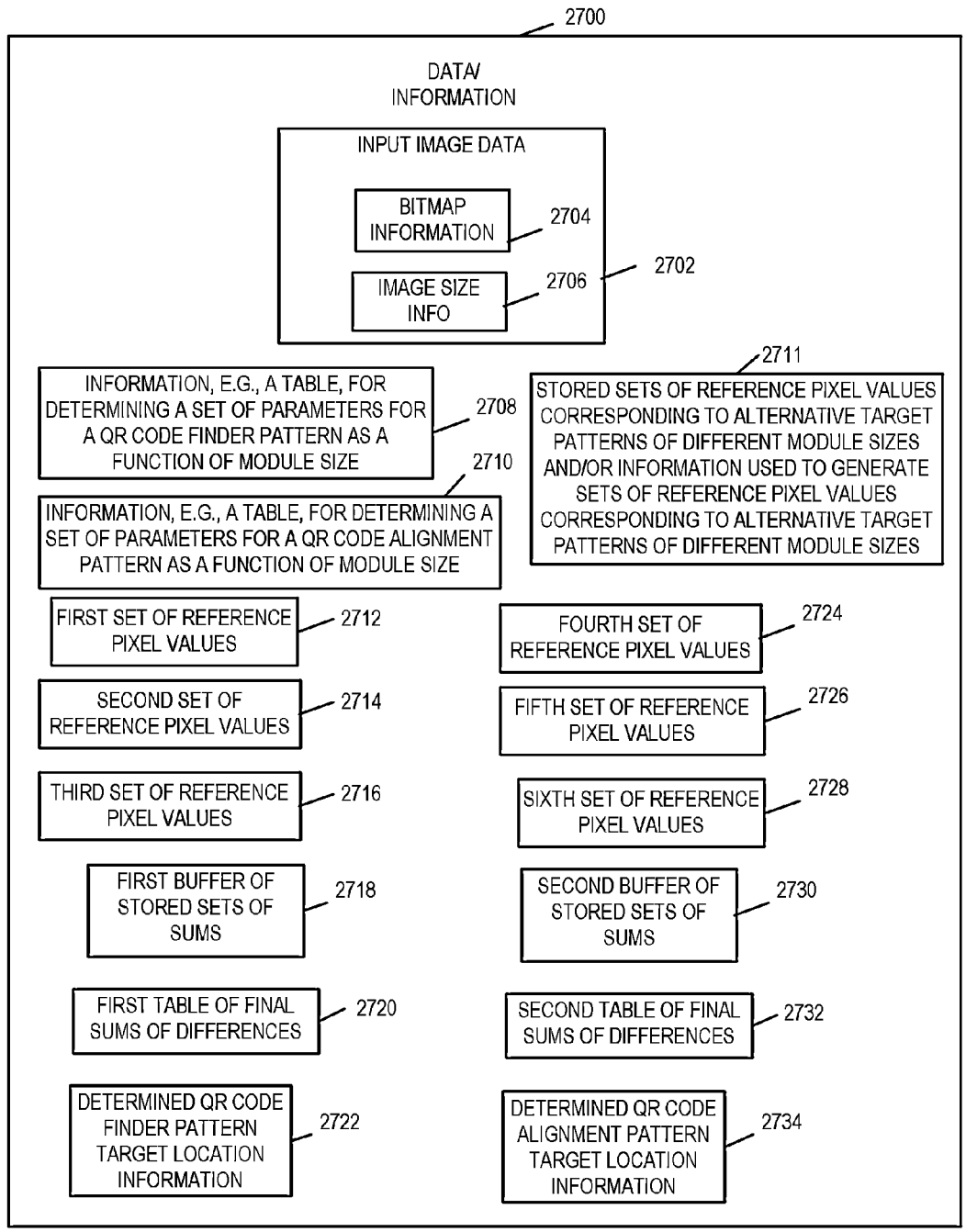
FIG. 27 is a drawing of exemplary data/information that may be included in the exemplary device of FIG. 24.

FIG. 27 is a drawing of exemplary data/information 2700. Data/information 2700 is, in some embodiments, included in data/information 2420 of memory 2416 of device 2400 of FIG. 24. Data/information 2700 includes input image data 2702, information, e.g., a table, for determining a set of parameters for a QR code finder pattern as a function of module size 2708, information, e.g., a table, for determining a set of parameters for a QR code alignment pattern as a function of module size 2710, stored sets of reference pixel values corresponding to alternative target patterns of different sizes and/or information to generate sets of reference pixel values corresponding to alternative target patterns of different sizes 2711, a first set of reference pixel values 2712, a second set of reference pixel values 2714, a third set of reference pixel values 2716, a first buffer of stored sets of sums 2718, a first table of final sums of differences 2720, determined QR code finder pattern target location information 2722, a fourth set of reference pixel values 2724, a fifth set of reference pixel values 2726, a sixth set of reference pixel values 2728, a second buffer of stored sets of sums 2730, a first table of final sums of differences 2732, and determined QR code alignment pattern target location information 2734.

The techniques of various embodiments may be implemented using software, hardware and/or a combination of software and hardware. Various embodiments are directed to apparatus, e.g., an image processing device or system. Various embodiments are also directed to methods, e.g., a method of locating a target pattern within an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a cameral with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of identifying the location of a first target image pattern in an image comprising:
generating, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image;
generating a first sum of difference values from at least some values in the generated sets of difference measure values, said sum of difference values indicating a detected amount of difference between a first two dimensional array of pixel values and a two dimensional target pattern; and
making a decision as to the location of the first target pattern within said image based on at least said first sum of difference values.

2. The method of claim 1, wherein each of the individual set of pixel values in said W individual sets of pixel values corresponds to a single row or column; and
wherein generating, a corresponding set of difference measure values for one of said W individual sets of pixel values of an image includes:
comparing the pixel values in said individual set of pixel values to a first set of reference pixel values to generate a first difference value, said first difference value indicating a determined difference between the individual set of pixel values and the first set of reference pixel values.

3. The method of claim 2, wherein generating, a corresponding set of difference measure values for one of said W individual sets of pixel values of an image includes:
comparing the pixel values in said individual set of pixel values to a second set of reference pixel values to generate a second difference value, said second difference value indicating a determined difference between the individual set of pixel values and the second set of reference pixel values.

4. The method of claim 3, wherein generating, a corresponding set of difference measure values for one of said W individual sets of pixel values of an image includes:
comparing the pixel values in said individual set of pixel values to a third set of reference pixel values to generate a third difference value, said third difference value indicating a determined difference between the individual set of pixel values and the third set of reference pixel values.

5. The method of claim 4, wherein said first set of reference pixel values corresponds to a first pattern of pixels expected to appear in a first row of the first target image pattern.

6. The method of claim 5, wherein said second set of reference pixel values corresponds to a second pattern of pixels expected to appear in an intermediate row of the first target image.

7. The method of claim 6, wherein said third set of reference pixel values corresponds to a third pattern of pixels expected to appear in a center row of the first target image pattern.

8. The method of claim 7, wherein generating a first sum of difference values from at least some values in the generated sets of difference measure values includes:
summing a single difference value from at least 3 different sets of difference measure values, said first sum including no more than one difference value from each set of difference measure values used to generate said first sum.

9. The method of claim 8, wherein generating a first sum of difference values includes summing at least one difference measure value corresponding to each of said first, second and third reference patterns.

10. The method of claim 1, further comprising:
storing corresponding multiple sets of generated difference measure values in memory at the same time; and
wherein generating said first sum of difference values includes accessing a first plurality of stored sets of generated difference measure values to retrieve there from difference values used in generating said first sum of difference values.

11. The method of claim 10, further comprising:
generating a second sum of difference values from at least some values in the stored sets of difference measure values, said second sum being generated from at least one difference value corresponding to a set of difference measure values which is not used to generate said first sum of difference values.

12. The method of claim 11, wherein generating a second sum of difference values from at least some values in the generated sets of difference measure values, includes accessing a second plurality of stored sets of difference values used in generating said first sum of difference values.

13. The method of claim 12, wherein said second sum is generated from at least one difference value corresponding to a set of difference measure values which is not used to generate said first sum of difference values.

14. The method of claim 13, wherein making a decision as to the location of the first target pattern within said image is based on at least both said first sum of difference values and said second sum of difference values.

15. The method of claim 14, wherein making a decision as to the location of the first target pattern includes identifying which of a plurality of generated sums of difference values is smallest.

16. The method of claim 2, wherein said first target image pattern is one of a QR code finder pattern and a QR code alignment pattern.

17. The method of claim 16, wherein said first target image pattern is a QR code finder pattern, the method also being for identifying a location of a second target image pattern in said image, the method further comprising:
generating, for each one of Z individual sets of pixel values of an image, a corresponding second set of difference measure values, said corresponding second set of difference measure values including at least one of a fourth difference measure value, a fifth difference measure value, or a sixth difference measure value, said fourth difference measure value indicating a measure of the difference between pixel values in said individual one of Z sets of pixel values and a fourth reference set of pixel values, said fifth difference measure value indicating a measure of the difference between pixel values in said individual one of Z sets of pixel values and a fifth reference set of pixel values, said sixth difference measure value indicating a measure of the difference between pixel values in said individual one of Z sets of pixel values set and a sixth reference set of pixel values, said Z sets of pixel values including pixel values from at least two consecutive rows or columns of the image, each individual one of said Z sets of pixel values corresponding to a single row or column of pixel values;
generating an additional sum of difference values from at least some values in the generated sets of difference measure values corresponding to said Z individual sets of pixel values, said additional sum of difference values indicating a detected amount of difference between a second two dimensional array of pixel values and a second two dimensional target pattern; and
making a decision as to the location of the second target pattern within said image based on at least said generated additional sum of difference values.

18. The method of claim 17, wherein said second target image pattern is QR code alignment pattern, said fourth, fifth and sixth reference pixel patterns including fewer pixels than said first, second and third reference pixel patterns,
wherein said first and fourth reference pixel patterns are solid black pixel patterns,
wherein said second and fifth reference pixel patterns are black-white-black pixel patterns; and
wherein said third and sixth reference pixel patterns are black-white-black-white-black pixel patterns.

19. A non-transitory computer readable medium comprising:
computer executable instructions which when executed by a computer control the computer to generate, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image;
computer executable instructions which when executed by the computer control the computer to generate a first sum of difference values from at least some values in the generated sets of difference measure values, said sum of difference values indicating a detected amount of difference between a first two dimensional array of pixel values and a two dimensional target pattern; and
computer executable instructions which when executed by the computer control the computer to make a decision as to the location of the first target pattern within said image based on at least said first sum of difference values.

20. A device comprising:
at least one processor configured to:

generate, for each one of W individual sets of pixel values of an image, a corresponding set of difference measure values, said corresponding set of difference measure values including at least one of a first difference measure value, a second difference measure value, or a third difference measure value, said first difference measure value indicating a measure of the difference between pixel values in said individual set of pixel values and a first reference set of pixel values, said second difference measure value indicating a measure of the difference between pixel values in said individual set of pixel values and a second reference set of pixel values, said third difference measure value indicating a measure of the difference between pixel values in said individual set of pixel values and a third reference set of pixel values, said W sets of pixel values including pixel values from at least two consecutive rows or columns of the image;

generate a first sum of difference values from at least some values in the generated sets of difference measure values, said sum of difference values indicating a detected amount of difference between a first two dimensional array of pixel values and a two dimensional target pattern; and make a decision as to the location of the first target pattern within said image based on at least said first sum of difference values; and memory coupled to said at least one processor.

* * * * *